United States Patent
Getty et al.

(10) Patent No.: US 12,157,619 B2
(45) Date of Patent: Dec. 3, 2024

(54) PROCESS FOR FORMING IMPROVED PROTECTIVE ECO-FRIENDLY POUCH AND PACKAGING AND PRODUCTS MADE THEREFROM

(71) Applicants: Henkel AG & Co. KGaA, Dusseldorf (DE); Graphic Innovators, LLC, Elk Grove Village, IL (US)

(72) Inventors: Kris Getty, Deerfield, IL (US); Daniel Waski, Elmhurst, IL (US); Alexis Kriegl, Pittstown, NJ (US); Bradley McLeod, Bloomsbury, NJ (US); Tianjian Huang, Hillsborough, NJ (US); Scott Kiley, Williams Bay, WI (US); Stephan Carter, Barrington Hills, IL (US); Jeff Menolascino, Marengo, IL (US)

(73) Assignees: HENKEL AG & CO. KGAA, Duesseldorf (DE); GRAPHIC INNOVATORS, LLC, Elk Grove Village, IL (US)

(*) Notice: Subject to any disclaimer, the term of this patent is extended or adjusted under 35 U.S.C. 154(b) by 0 days.

(21) Appl. No.: 16/128,329

(22) Filed: Sep. 11, 2018

(65) Prior Publication Data
US 2019/0062028 A1    Feb. 28, 2019

Related U.S. Application Data

(63) Continuation of application No. PCT/US2018/047526, filed on Aug. 22, 2018.
(Continued)

(51) Int. Cl.
B31B 70/81    (2017.01)
B31B 70/20    (2017.01)
(Continued)

(52) U.S. Cl.
CPC ............ B65D 81/022 (2013.01); B31B 70/20 (2017.08); B31B 70/626 (2017.08);
(Continued)

(58) Field of Classification Search
USPC ......................................................... 493/220
See application file for complete search history.

(56) References Cited

U.S. PATENT DOCUMENTS 2,147,689 A    2/1939   Chaffee
2,998,501 A    8/1961   Edberg
(Continued)

FOREIGN PATENT DOCUMENTS

CA    2145938 A1    10/1995
CA    2078476 A1    5/1997
(Continued)

OTHER PUBLICATIONS

International Search Report and Written Opinion, International Application No. PCT/US2018/047526, dated Jan. 18, 2019.
(Continued)

*Primary Examiner* — Sameh Tawfik
(74) *Attorney, Agent, or Firm* — Hoffmann & Baron, LLP

(57) ABSTRACT

The present invention relates generally to a protective wrap and a protective envelope or pouch made therefrom, as well as the apparatus and process for forming such wraps and envelopes. Water-based heat-expandable adhesives (WBHEA) which include a plurality of heat-expandable microspheres are disposed in a pattern between web substrates on a continuous, high speed manufacturing line to produce padded, insulated products useful as envelopes, mailers and other protective packaging.

33 Claims, 7 Drawing Sheets

Related U.S. Application Data

(60) Provisional application No. 62/550,008, filed on Aug. 25, 2017.

(51) Int. Cl.

| | |
|---|---|
| *B31B 70/62* | (2017.01) |
| *B32B 7/14* | (2006.01) |
| *B32B 29/00* | (2006.01) |
| *B32B 37/00* | (2006.01) |
| *B32B 37/12* | (2006.01) |
| *B65D 30/08* | (2006.01) |
| *B65D 33/01* | (2006.01) |
| *B65D 65/22* | (2006.01) |
| *B65D 65/40* | (2006.01) |
| *B65D 81/02* | (2006.01) |
| *B65D 81/03* | (2006.01) |
| *B31B 155/00* | (2017.01) |
| *B31B 170/20* | (2017.01) |

(52) U.S. Cl.
CPC ............ *B31B 70/813* (2017.08); *B32B 7/14* (2013.01); *B32B 29/005* (2013.01); *B32B 37/0084* (2013.01); *B32B 37/1207* (2013.01); *B32B 37/1292* (2013.01); *B65D 31/02* (2013.01); *B65D 33/01* (2013.01); *B65D 65/22* (2013.01); *B65D 65/40* (2013.01); *B65D 81/03* (2013.01); *B31B 2155/002* (2017.08); *B31B 2170/20* (2017.08); *B32B 2037/1276* (2013.01); *B32B 2310/0868* (2013.01); *B32B 2439/46* (2013.01); *B32B 2553/02* (2013.01)

(56) References Cited

U.S. PATENT DOCUMENTS

| | | | | |
|---|---|---|---|---|
| 3,152,749 | A * | 10/1964 | Young | B65D 65/40 164/DIG. 5 |
| 3,252,064 | A | 5/1966 | Duncan | |
| 3,253,064 | A | 5/1966 | Buonaiuto | |
| 3,300,360 | A | 1/1967 | Williams et al. | |
| 3,342,613 | A * | 9/1967 | Schelhorn | B65D 65/40 156/291 |
| 3,401,475 | A | 9/1968 | Morehouse et al. | |
| 3,563,851 | A | 2/1971 | Armour et al. | |
| 3,583,851 | A | 6/1971 | Ernest et al. | |
| 3,615,972 | A | 10/1971 | Morehouse, Jr. | |
| 3,732,975 | A * | 5/1973 | Poncy | G01K 1/083 206/212 |
| 3,904,429 | A | 9/1975 | Eastman et al. | |
| 4,005,033 | A | 1/1977 | Georgeau et al. | |
| 4,006,273 | A | 2/1977 | Wolinski et al. | |
| 4,038,762 | A | 8/1977 | Swan, Jr. | |
| 4,087,002 | A * | 5/1978 | Bambara | B29C 65/18 206/523 |
| 4,094,685 | A | 6/1978 | Lester et al. | |
| 4,193,499 | A | 3/1980 | Lookholder | |
| 4,350,788 | A | 9/1982 | Shimokawa et al. | |
| 4,483,889 | A | 11/1984 | Andersson | |
| 4,531,038 | A | 7/1985 | Lillibridge et al. | |
| 4,661,401 | A * | 4/1987 | Akao | B32B 5/18 428/215 |
| 4,690,843 | A | 9/1987 | Inagaki | |
| 4,708,896 | A * | 11/1987 | Akao | B65D 81/30 428/34.3 |
| 4,720,410 | A | 1/1988 | Lundquist | B32B 27/10 428/136 |
| 4,900,594 | A | 2/1990 | Quick et al. | |
| 4,925,711 | A * | 5/1990 | Akao | B32B 27/08 428/35.2 |
| 5,030,302 | A * | 7/1991 | Jud | B32B 7/14 156/164 |
| 5,082,744 | A * | 1/1992 | Akao | B32B 7/04 428/522 |
| 5,100,721 | A * | 3/1992 | Akao | B32B 27/08 428/218 |
| 5,114,509 | A | 5/1992 | Johnston et al. | |
| 5,236,977 | A | 8/1993 | Eden et al. | |
| 5,264,467 | A | 11/1993 | DiStefano | |
| 5,277,737 | A | 1/1994 | Li et al. | |
| 5,288,765 | A | 2/1994 | Bastioli et al. | |
| 5,325,781 | A | 7/1994 | Dupont et al. | |
| 5,342,467 | A * | 8/1994 | Corey | B31F 5/04 156/227 |
| 5,356,683 | A | 10/1994 | Egolf et al. | |
| 5,387,626 | A | 2/1995 | Boehme-Kovac et al. | |
| 5,393,336 | A | 2/1995 | Foran et al. | |
| 5,415,339 | A | 5/1995 | Howard | |
| 5,451,437 | A * | 9/1995 | Insley | B01L 9/06 206/484.2 |
| 5,542,599 | A | 8/1996 | Sobol | |
| 5,612,385 | A | 3/1997 | Ceaser et al. | |
| 5,636,493 | A * | 6/1997 | Weder | A01G 5/04 53/397 |
| 5,685,480 | A | 11/1997 | Choi | |
| 5,759,624 | A | 6/1998 | Neale et al. | |
| 5,881,883 | A * | 3/1999 | Siegelman | G01K 1/083 206/212 |
| 5,928,741 | A | 7/1999 | Andersen et al. | |
| 6,139,961 | A | 10/2000 | Blankenship et al. | |
| 6,231,970 | B1 | 5/2001 | Andersen et al. | |
| 6,255,369 | B1 | 7/2001 | Philbin et al. | |
| 6,312,713 | B1 * | 11/2001 | Korol | A61K 9/4858 424/443 |
| 6,352,769 | B1 | 3/2002 | Mori | |
| 6,379,497 | B1 | 4/2002 | Sandstrom et al. | |
| 6,648,955 | B1 | 11/2003 | Swiezkowski et al. | |
| 6,740,373 | B1 | 5/2004 | Swoboda et al. | |
| 6,740,706 | B2 | 5/2004 | Ohrbom et al. | |
| 6,749,705 | B2 | 6/2004 | Skrzyniarz et al. | |
| 6,838,187 | B2 | 1/2005 | Figiel et al. | |
| 6,951,677 | B2 | 10/2005 | Ishikawa et al. | |
| 7,335,279 | B2 | 2/2008 | Mohan et al. | |
| 7,718,751 | B2 | 5/2010 | Orpin | |
| 7,799,968 | B2 * | 9/2010 | Chen | A47L 13/16 428/156 |
| 8,568,029 | B2 | 10/2013 | Kannankeril et al. | |
| 8,568,283 | B2 * | 10/2013 | Broering | B32B 27/10 428/136 |
| 8,574,698 | B2 * | 11/2013 | Fung | B32B 3/26 428/40.1 |
| 8,747,603 | B2 * | 6/2014 | Huang | B29C 65/18 206/523 |
| 9,056,712 | B2 * | 6/2015 | Cook | B31B 50/74 |
| 9,260,633 | B2 * | 2/2016 | Hoa | H01B 1/24 |
| 9,273,230 | B2 * | 3/2016 | Huang | B32B 5/02 428/34.3 |
| 9,522,772 | B2 | 12/2016 | Fu et al. | |
| 9,580,228 | B2 | 2/2017 | Fu et al. | |
| 9,580,629 | B2 | 2/2017 | Huang et al. | |
| 9,591,937 | B2 | 3/2017 | Fu et al. | |
| 9,648,969 | B2 | 5/2017 | Fu et al. | |
| 9,657,200 | B2 * | 5/2017 | Huang | A47L 13/16 428/156 |
| 9,865,551 | B2 * | 1/2018 | Takano | B32B 3/26 428/40.1 |
| 10,099,459 | B2 | 10/2018 | Huang et al. | |
| 10,100,231 | B2 | 10/2018 | Huang et al. | |
| 10,144,573 | B2 | 12/2018 | Fu et al. | |
| 10,183,458 | B2 * | 1/2019 | Fu | B65D 81/3823 |
| 10,259,151 | B2 | 4/2019 | Kiiskinen et al. | |
| 10,815,397 | B2 | 10/2020 | Huang et al. | |
| 11,104,497 | B2 | 8/2021 | Lee et al. | |
| 2001/0049007 | A1 | 12/2001 | Jones | |
| 2002/0068139 | A1 | 6/2002 | Polak et al. | |
| 2002/0071947 | A1 | 6/2002 | Soane et al. | |
| 2002/0094403 | A1 | 7/2002 | Ishikawa et al. | |
| 2002/0115785 | A1 | 8/2002 | Weitzel et al. | |
| 2002/0182347 | A1 | 12/2002 | DeBraal et al. | |
| 2003/0003197 | A1 | 1/2003 | Berlin et al. | |

(56) References Cited

U.S. PATENT DOCUMENTS

| | | |
|---|---|---|
| 2003/0034117 A1 | 2/2003 | Thomas et al. |
| 2004/0005100 A1 | 1/2004 | Versluys |
| 2004/0033343 A1 | 2/2004 | Comeau et al. |
| 2004/0065539 A1 | 4/2004 | Sosnowski |
| 2004/0191438 A1* | 9/2004 | Cosentino ............... B32B 5/02 428/34.3 |
| 2005/0067095 A1 | 3/2005 | Hasenoehrl et al. |
| 2005/0152624 A1 | 7/2005 | Versluys |
| 2005/0163974 A1 | 7/2005 | Geeroms |
| 2007/0009723 A1 | 1/2007 | Ogawa et al. |
| 2007/0155859 A1 | 7/2007 | Song et al. |
| 2007/0224395 A1 | 9/2007 | Rowitsch et al. |
| 2007/0228134 A1 | 10/2007 | Cook et al. |
| 2007/0287776 A1 | 12/2007 | Nordin et al. |
| 2008/0017338 A1 | 1/2008 | Nordin et al. |
| 2008/0055380 A1 | 3/2008 | Regan et al. |
| 2008/0118693 A1 | 5/2008 | Bilski et al. |
| 2009/0280322 A1 | 11/2009 | Daniels et al. |
| 2009/0306255 A1 | 12/2009 | Patel et al. |
| 2009/0321508 A1 | 12/2009 | Fu et al. |
| 2010/0012712 A1 | 1/2010 | Swoboda et al. |
| 2010/0044907 A1 | 2/2010 | Burke |
| 2010/0068544 A1 | 3/2010 | Huang et al. |
| 2010/0119741 A1 | 5/2010 | Cimecioglu et al. |
| 2010/0136269 A1 | 6/2010 | Andersen et al. |
| 2010/0139878 A1 | 6/2010 | Nicolucci |
| 2010/0181015 A1 | 7/2010 | Kohler |
| 2011/0019121 A1 | 1/2011 | Mo et al. |
| 2011/0033398 A1 | 2/2011 | Cauvin et al. |
| 2011/0064926 A1 | 3/2011 | Babinsky et al. |
| 2011/0248076 A1 | 10/2011 | Bentmar et al. |
| 2012/0015162 A1 | 1/2012 | Lion et al. |
| 2012/0043373 A1 | 2/2012 | Babinsky et al. |
| 2012/0048450 A1 | 3/2012 | Fu et al. |
| 2012/0100289 A1 | 4/2012 | Egan et al. |
| 2013/0303351 A1 | 11/2013 | Fu et al. |
| 2014/0004563 A1 | 1/2014 | Paripati et al. |
| 2014/0087109 A1 | 3/2014 | Huang et al. |
| 2014/0131367 A1 | 5/2014 | Bordary et al. |
| 2014/0141185 A1 | 5/2014 | Huang et al. |
| 2014/0154492 A1 | 6/2014 | Traser et al. |
| 2014/0243442 A1 | 8/2014 | Coles et al. |
| 2015/0322301 A1 | 11/2015 | Ellis et al. |
| 2016/0050722 A1 | 2/2016 | Fu et al. |
| 2016/0194828 A1 | 7/2016 | Chang |
| 2016/0263876 A1 | 9/2016 | Huang et al. |
| 2017/0130058 A1* | 5/2017 | Huang ............... A61K 9/4858 424/443 |
| 2017/0130399 A1 | 5/2017 | Huang et al. |
| 2017/0341847 A1 | 11/2017 | Chase et al. |
| 2017/0361573 A1 | 12/2017 | Malmgren et al. |
| 2018/0148246 A1 | 5/2018 | Fu et al. |
| 2019/0031415 A1 | 1/2019 | Kumar |
| 2019/0106263 A1 | 4/2019 | Fu et al. |
| 2019/0152183 A1 | 5/2019 | Fu et al. |
| 2019/0161915 A1 | 5/2019 | Swails et al. |
| 2019/0284438 A1 | 9/2019 | McLeod et al. |

FOREIGN PATENT DOCUMENTS

| | | |
|---|---|---|
| CN | 1449913 A | 10/2003 |
| CN | 1643100 A | 7/2005 |
| CN | 101263184 A | 9/2008 |
| CN | 101476265 A | 7/2009 |
| DE | 60107070 T2 | 11/2005 |
| DE | 202011109020 U1 | 1/2012 |
| EP | 0890625 A1 | 1/1999 |
| EP | 0804331 A4 | 3/2000 |
| EP | 1216146 B1 | 10/2005 |
| EP | 1216246 B1 | 10/2005 |
| EP | 1634897 A2 | 3/2006 |
| EP | 1674543 A1 | 6/2006 |
| EP | 1780250 A1 | 5/2007 |
| GB | 1486328 A | 9/1977 |
| GB | 2 303 630 A | 2/1997 |
| JP | S5085483 A | 7/1975 |
| JP | 61-44965 A | 3/1986 |
| JP | 86144965 A | 3/1986 |
| JP | 5-239423 A | 9/1993 |
| JP | 6-313163 A | 11/1994 |
| JP | 8-175576 A | 7/1996 |
| JP | 9-164621 A | 6/1997 |
| JP | 9-217050 A | 8/1997 |
| JP | 2000006285 A | 1/2000 |
| JP | 2000159268 A | 6/2000 |
| JP | 2001-207146 A | 7/2001 |
| JP | 2001191436 A | 7/2001 |
| JP | 2002-241450 A | 8/2002 |
| JP | 2003072854 A | 3/2003 |
| JP | 2003-154589 A | 5/2003 |
| JP | 2005-97816 A | 4/2005 |
| JP | 2009179894 A | 8/2009 |
| JP | 2010-202996 A | 9/2010 |
| JP | 2013067070 A | 4/2013 |
| JP | 2014024583 A | 2/2014 |
| JP | 2015196773 A | 11/2015 |
| JP | 2017039523 A | 2/2017 |
| KR | 20170065618 A | 6/2017 |
| WO | 9014223 A1 | 11/1990 |
| WO | 9633923 A1 | 10/1996 |
| WO | 0069747 A1 | 11/2000 |
| WO | 0162986 A1 | 8/2001 |
| WO | 0200800 A2 | 1/2002 |
| WO | 0231077 A2 | 4/2002 |
| WO | 2005110737 A1 | 11/2005 |
| WO | 2007091961 A1 | 8/2007 |
| WO | 2007135451 A1 | 11/2007 |
| WO | 2007142593 A1 | 12/2007 |
| WO | 2008084372 A1 | 7/2008 |
| WO | 2014015060 A2 | 1/2014 |
| WO | 2015036901 A1 | 3/2015 |
| WO | 2015066806 A1 | 5/2015 |
| WO | 2015081097 A1 | 6/2015 |
| WO | 2016/014486 A1 | 1/2016 |
| WO | 2019018523 A1 | 1/2019 |

OTHER PUBLICATIONS

Popil, Roman E. et al. "Adhesive level effect on corrugated board strength—experiment and FE modeling." Abstract submitted for the 2007 International Progress in Paper Physics Seminars, pp. 1-6.

Bermesheva, E.V. "Zavisimost mezhdu vyazkouprugimi I adgezivnymi svoistvami polimernykh adgezivov. Dopolneni kriteriya liplosti Dalkkuista", 25 Sipozium Po Reologii, G.Ostashkov, Sep. 5-10, 2010, pp. 61-62.

Radio Frequency (RF) vs. Microwave (MW). Retrieved from http://www.stalam.com/en/technologies/radio-frequency-and-micro-wawes.html.

NXP, FTF 2016 Technology Forum, "Advantages of Solid State RF Power Over Vacuum Tubes in Industrial Applications", May 18, 2016. (Year: 2016).

Skylighter, "Kraft Paperweights and Thickness Comparison Chart", Feb. 14, 2018. (Year: 2018).

European Search Results Under Rule 164(2)(b) EPC EP 18769557 Completed: May 27, 2021; dated Jun. 2, 2021 7 Pages.

https://cris.vtt.fi/en/publications/foam-forming-technology-enables-new-possibilities-for-paper-indus.

https://www.vttresearch.com/en/ourservices/foam-forming-platform.

Jiao, Shunshan et al., "Principles of Radio-Frequency and Microwave Heating", Radio-Frequency Heating in Food Processing, CRC Press, 2015, p. 4. Month of Publication Unknown. (Year: 2015).

Industrial Pharmaceutics, Editor-in-chief: Rongfeng Hu, Beijing: China Press of Traditional Chinese Medicine, Aug. 2010, p. 396., China Press of Traditional Chinese Medicine.

* cited by examiner

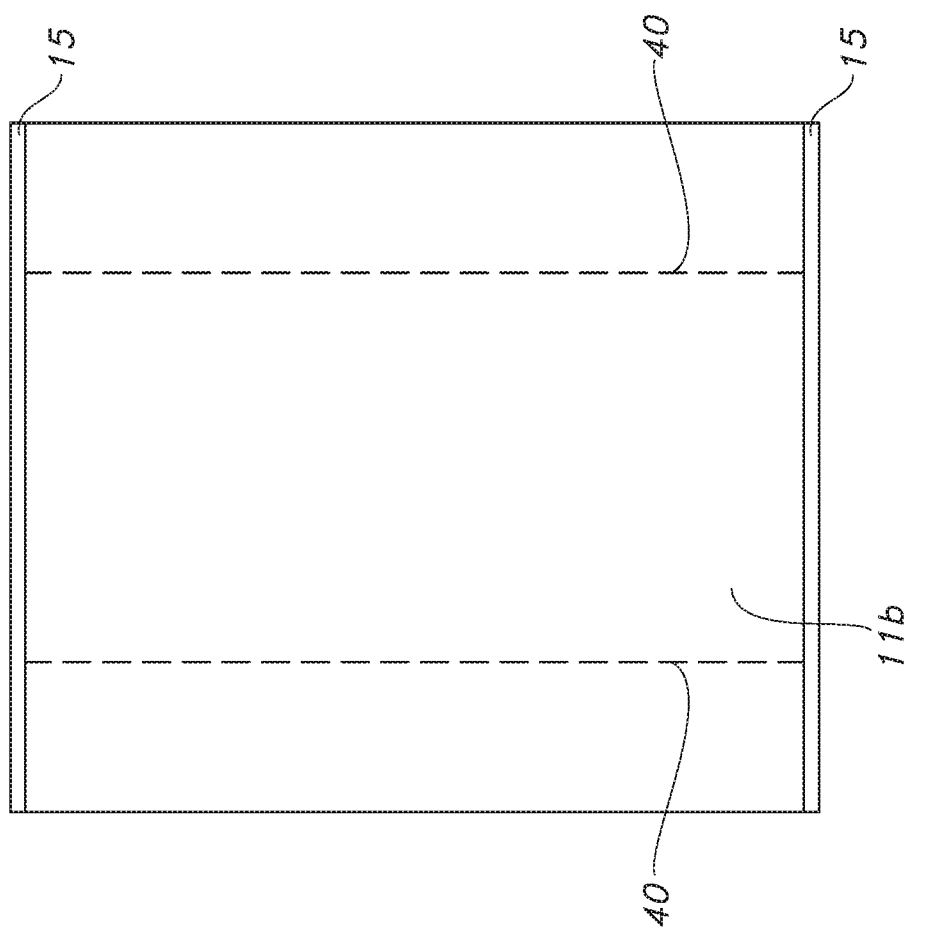

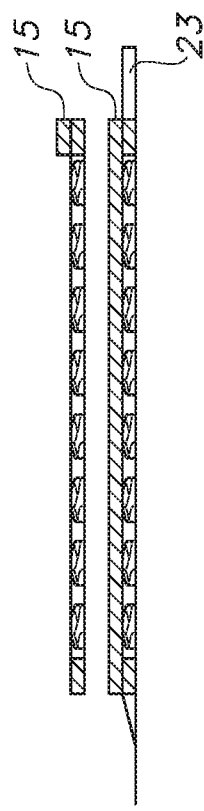
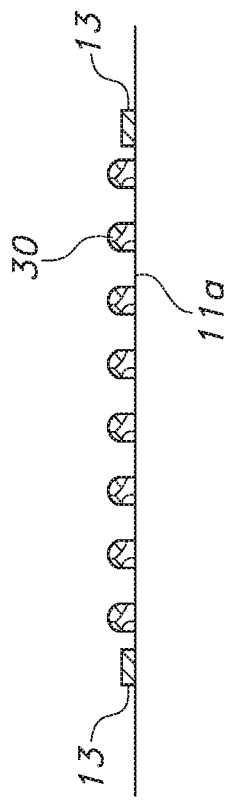
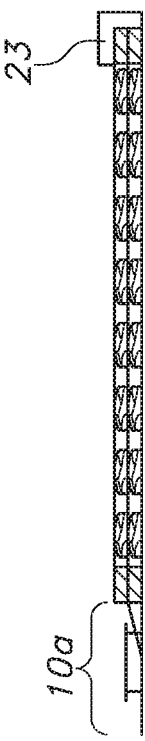
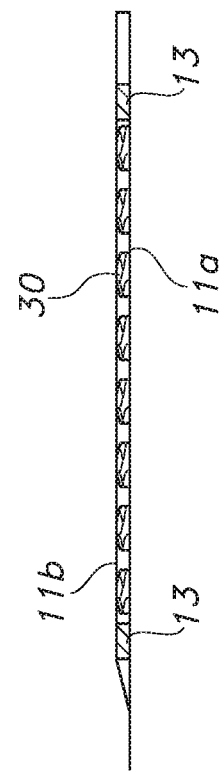
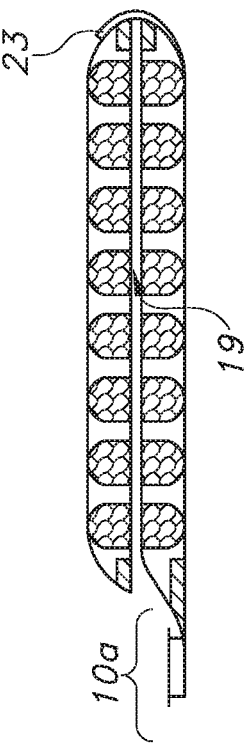
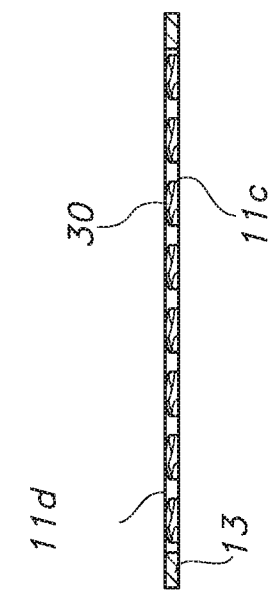
FIG. 5
FIG. 6
FIG. 7
FIG. 8
FIG. 9
FIG. 10

PROCESS FOR FORMING IMPROVED PROTECTIVE ECO-FRIENDLY POUCH AND PACKAGING AND PRODUCTS MADE THEREFROM

CROSS-REFERENCE TO RELATED APPLICATIONS

The application is a continuation of PCT/US18/47526 filed Aug. 22, 2018, which claims the benefit of priority to U.S. Provisional Application 62/550,008 filed Aug. 25, 2017, both of which are incorporated herein by reference in their entirety.

FIELD OF THE INVENTION

The present invention relates generally to a protective wrap and a protective envelope or pouch made therefrom, as well as the apparatus and process for forming such wrap and envelope.

BACKGROUND OF THE INVENTION

In order to protect various items during handling, shipping or transportation, protective products such as padded wraps, envelopes, packages and containers are currently used. Such protective products may be placed in surrounding engagement with the product to protect the product from potentially damaging contact. In addition, such padded wraps may be used to form a protective pouch or an envelope which permits the product to be shipped in a protective manner. Such protective products traditionally used closed cell extruded polystyrene foam to form a cushion or plastic "bubble wrap" material which relies on an air gap or bubble between the plastic layers, to form the protective cushion. However, as may be appreciated, plastic bubble wrap packages and polystyrene foam are not an environmentally sound way of protecting various items. Attempts to make more environmentally friendly protective wrap have drawbacks including high shipping weight, non-uniformity in the protective layer and lack of the requisite consistent protective quality. For example, alternative approaches have focused on eco-friendly, biodegradable and/or compostable products, such as cellulose-based substrates, sourced from renewable materials. However, as the package is handled and flexed, the air gaps between the two substrates become compressed and the protective cushion area is decreased in those compressed areas. Conventional cellulosic alternatives still suffer from high shipping weight (excessive padding material) and inconsistent protective padded areas.

More recently, adhesive compositions having thermally insulative and cushion-like properties have been provided for use in protective packages and wrap. For example, see U.S. Pat. Nos. 9,580,629, 8,747,603, 9,273,230, 9,657,200, US 20140087109, US 20170130399, US 20170130058, and US 20160263876, the subject matter of each being incorporated herein in their entirety. These packages are formed with an air gap in the coating/adhesive sandwiched between two substrates, which provides insulation. These prior adhesives required conventional oven heating for curing/coalescing the adhesive (polymers), which means prolonged process time and large manufacturing space to allow for water evaporation. Moreover, as the size of the packages vary, the insulative gap is not always uniform. While microwave heating provides strict controls for level of moisture and uniform air gaps, the depth of penetration using microwave heating is limited only to about 1.5 inches. Thus, any substrate that has a thickness greater than about 1.5 inches may result in non-uniform packages.

There is a need in the art for methods to provide uniform protective padding for all sizes of packages. The present invention provides methods to produce environmentally and economically sound package padding (cushioning), as well as insulation material, such that uniform protective products such as wraps, envelopes and other containers can be made.

SUMMARY OF THE INVENTION

The present invention solves the problems associated with prior art protective and insulated products, while also being eco-friendly.

The protective wraps and packages of the present invention have greater structural integrity than similar currently available kraft paper and plastic bubble products, while providing a fully recyclable paper option that reduces the environmental impact of shipping and e-commerce. This is due in part to the combination of materials used and the process of manufacturing employed. The present invention also uses less paper than other eco-friendly mailers, which are heavy and have higher shipping costs.

As used herein, the terms web substrates, layers and ribbons will be used interchangeably.

In one aspect of the invention there is provided a method of manufacturing a protective padded wrap on a continuous manufacturing line, the method including:

a.) providing a first continuous web substrate having a top side and a bottom side, and a length and a width which defines a perimeter and an inner perimeter portion;

b.) providing a second continuous web substrate having a top side and a bottom side, and a length and width which defines a perimeter thereabout and an inner-perimeter portion;

c.) applying a discontinuous layer of a sealing adhesive to one or more of the perimeters of the first and second web substrates, whereby at least one vent for water evaporation is formed at the one or more perimeters, or alternatively, applying a continuous and/or discontinuous layer of sealing adhesive to the perimeters of the web substrates and puncturing or perforating the substrates to create vents for water evaporation one skilled in the art can adjust the number of perforations, punctures, and/or configuration of the seam adhesive perimeter based on the porosity and thickness of the substrates;

d.) depositing a pattern of a water-based heat-expandable adhesive (WBHEA) comprising a water-based polymer and a plurality of heat-expandable microspheres on the inner portion of one or more of the first web and the second web, the WBHEA forming a protective padded area when expanded;

e.) joining the first and second webs at their respective perimeters to form a sealed structure enclosing the WBHEA without substantially compressing the WBHEA therebetween; for example, the process of sealing any of the perimeters must not negatively affect the ability to obtain the desired expansion of the WBHEA when heated and water is removed;

f.) exposing the sealed structure to radio frequency (RF) radiation to expand and set the WBHEA to form the protective padded wrap; and g.) optionally further processing the protective padded pouch to obtain a substantially uniform thickness. Such further processing may be considered a sizing and/or shaping step and accomplished in a variety of ways, but one desirable method is the use of a roller held at an adjustable gap above a moving conveyor belt, whereby the thickness of the protective padded pouch may be made substantially uniform, or whereby portions of the pouch may be sized at different thicknesses, or whereby the shape of the product may be modified to a desired shape or configuration.

The thus formed protective padded wrap may be further joined with a second protective wrap by sealing their respective perimeters to form an open pouch therebetween, which may include and open end and an associated closure flap. In other words, the above steps may be used to create a final multi-layered sheet-like product which may be rolled up and/or cut to size, as well as an intermediate product which can then be further processed to make a different final product, such as a mailer or other product structure, by mating individually formed padded wraps to form a pouch therebetween. As will be also discussed herein, additional manufacturing methods for making mailers and protective products are also disclosed.

In another aspect of the invention there is included a method of manufacturing a protective padded wrap in a continuous manufacturing line which includes:

a.) providing a first web substrate having a top side and a bottom side, and a length and a width which define a perimeter and an inner portion within the perimeter;

b.) providing a second web substrate having a top side and a bottom side, and a length and width which define a perimeter and an inner portion within the perimeter, wherein the perimeter of the first web is in spaced-apart alignment with the perimeter of the bottom side of the second web;

c.) applying a discontinuous layer of sealing adhesive about the perimeter of the top side of the first web to form a sealable perimeter portion having vents to allow for water evaporation, or alternatively, applying a continuous and/or discontinuous layer of sealing adhesive to the perimeters of the web substrates and puncturing or perforating the substrates allowing vents for water evaporation;

d.) depositing a pattern of a water-based heat-expandable adhesive (WBHEA) on the inner portion within the perimeter of the top side of the first web, the WBHEA forming a protective padded area when expanded;

e.) forming a laminated structure by mating the top side of the first web with the bottom side of the second web at their respective perimeter portions to form one or more sealed seams, the laminated structure housing the WBHEA therebetween, wherein the formation of the laminated structure is carried out without substantially compressing the WBHEA therebetween and while substantially maintaining the dimensions of the pattern of the WBHEA prior to its expansion; for example the process of sealing any of the perimeters must not negatively affect the ability to obtain the desired expansion of the WBHEA when heated and water is removed;

f.) exposing the thus formed laminated structure to sufficient RF radiation to expand and set/coalesce the WBHEA to form the protective padded wrap, whereby vents, punctures, or perforations permit water vapor to escape; and g.) optionally further processing the protective padded pouch to obtain a substantially uniform thickness. Such further processing may be considered a sizing and/or shaping step and accomplished in a variety of ways, but one desirable method is the use of a roller held at an adjustable gap above a moving conveyor belt, whereby the thickness of the protective padded pouch may be made substantially uniform, or whereby portions of the pouch may be sized at different thicknesses, or whereby the shape of the product may be modified to a desired shape or configuration.

In yet another aspect of the invention there is provided a method of manufacturing a protective padded pouch which includes:

a.) providing a first web having a length and width and a top side and a bottom side, which define a perimeter thereabout and an inner portion within the perimeter;

b.) providing a second web having a length and width and a top side and a bottom side which define a perimeter thereabout and an inner portion within the perimeter;

c.) applying a discontinuous layer of a sealing adhesive about the perimeter of the top side of the first web to form a sealable perimeter portion, wherein adhesive gaps of the discontinuous layer form evaporative vents for water removal, or alternatively, applying a continuous and/or discontinuous layer of sealing adhesive to the perimeters of the web substrates and puncturing or perforating the substrates allowing vents for water evaporation;

d.) depositing a pattern of a water-based heat-expandable adhesive (WBHEA) on the inner portion within the perimeter of the top side of the first web, the WBHEA forming a protective padded area when expanded;

e.) forming a two layer laminate structure by mating the top side of the first web with the bottom side of the second web at their respective sealable perimeter portions to form one or more sealed seams, the two layer laminated structure sealing the WBHEA therebetween, wherein the formation of the laminated structure does not substantially compress the WBHEA, and substantially maintains the dimensions of the pattern of the WBHEA prior to its expansion; for example the process of sealing any of the perimeters must not negatively affect the ability to obtain the desired expansion of the WBHEA when heated and water is removed;

f.) providing a third web having a top and bottom, and a length and width which define a perimeter and an inner portion within the perimeter and applying a continuous sealing adhesive about the perimeter of the top side of the third web to form a sealable perimeter portion;

g.) mating the bottom side of the third web with the top side of the two-layer laminate structure to form a pouch having an open side;

h.) applying a discontinuous sealing adhesive about the perimeter of the top side of the third web to form a sealable perimeter portion, whereby gaps in the adhesive are left to provide evaporative vents for water, or alternatively, applying a continuous and/or discontinuous layer of sealing adhesive to the perimeters of the web substrates and puncturing or perforating the substrates allowing vents for water evaporation;

i.) depositing a pattern of a water-based heat-expandable adhesive (WBHEA) on the inner portion within the perimeter of the top side of the third web, the WBHEA forming a protective padded area when expanded;

j.) providing a fourth web having a top side and a bottom side, and a length and a width which define a perimeter and an inner portion within the perimeter;

k.) mating the bottom side of the fourth web with the top side of the third web to form a four layer laminate structure and enclose the WBHEA therebetween, wherein the four-layer laminated structure is formed without substantially compressing the WBHEA, and the maintaining the dimensions of the pattern of the WBHEA prior to its expansion; for example the process of sealing any of the perimeters must not negatively affect the ability to obtain the desired expansion of the WBHEA when heated and water is removed; and l.) exposing the thus formed four-layer laminate structure to sufficient RF radiation to expand and cure/coalesce the WBHEA between the first and second web and between the third and fourth web to form the protective padded pouch; and m.) optionally further processing the protective padded pouch to obtain a substantially uniform thickness. Such further processing may be considered a sizing and/or shaping step and accomplished in a variety of ways, but one desirable method is the use of a roller held at an adjustable gap above a moving conveyor belt, whereby the thickness of the protective padded pouch may be made substantially uniform, and/or whereby portions of the pouch may be sized at different thicknesses, and/or whereby the shape of the product may be modified to a desired shape or configuration.

In yet another aspect of the invention there is provided a system for forming padded wraps from a first and second web of material supplied from a continuous source, each web having a perimeter and a perimeter interior, said system including:

a.) a first adhesive station for applying a discontinuous sealing adhesive to said perimeter of one surface of at least one of said webs;

b.) a second adhesive station for applying a pattern of a heat-expandable adhesive (WBHEA) to said perimeter interior of one surface of at least one of said webs to form a sealable perimeter portion having vents to allow for water evaporation, and/or alternatively, for applying a continuous and/or discontinuous layer of sealing adhesive to the perimeters of the web substrates and puncturing or perforating the substrates allowing vents for water evaporation;

c.) a joining station for joining said first and second webs by sealing said webs together at said perimeter with said WBHEA being maintained substantially uncompressed therebetween;

d.) a heat activation station for activating said heat-expandable adhesive to expand and cure said WBHEA;

e.) optionally a sizing and/or shaping station for further processing the protective padded pouch to obtain a substantially uniform thickness and/or a desired shape in selected portions of the pouch. Such further processing may be considered a sizing and/or shaping step and accomplished in a variety of ways, but one desirable method is the use of a roller held at an adjustable gap above a moving conveyor belt, whereby the thickness of the protective padded pouch may be made substantially uniform, or whereby portions of the pouch may be sized at different thicknesses, or whereby the shape of the product may be modified to a desired shape or configuration. It is also possible that the sizing and shaping station may be part of or combined with the heat activation station; and f.) a cutting station for cutting said webs into discrete lengths to form said padded wraps.

Padded wraps made in accordance with the teachings described herein, may be rolled up onto spools for storage or distribution similar to rolls of bubble wrap, or may be cut into smaller padded wrap sections and formed into individual padded units, such as mailers or envelope products.

In still another aspect of the invention the aforementioned system further forms a padded open ended pouch from two or more of said padded wraps, the steps further including:

a.) a pouch adhesive station for applying a continuous pouch perimeter adhesive to a perimeter of one surface of at least one of said wraps; and b.) a pouch joining station for joining said padded wraps together at said perimeter to form said open ended pouch.

In another aspect of the invention there is provided a padded wrap product which includes:

a.) first and second webs (substrates) of material each having a perimeter and an interior within said perimeter;

b.) a discontinuous and/or continuous perimeter adhesive joining said first and second webs of material at said perimeter, said perimeter including openings, such as vents, gaps perforations or punctures to permit water; and c.) a pattern of water-based heat-expanded adhesive (WBHEA) between said first and second webs of material within said perimeter interior for maintaining said first and second webs of material in spaced apart relationship at said interior.

In still another aspect of the invention there is provided a padded open ended pouch which includes:

a.) a pair of padded wraps joined substantially about their perimeter by a continuous and/or discontinuous perimeter adhesive to form an open ended pouch, said perimeters including openings, such as vents, gaps perforations or punctures to permit water evaporation, each of said padded wraps including:

b.) first and second webs of material each having a perimeter and an interior within said perimeter;

c.) a continuous and/or discontinuous perimeter adhesive joining said first and second webs of material at said perimeter said perimeter including openings, such as vents, gaps perforations or punctures to permit water evaporation; and d.) a pattern of water-based heat-expanded adhesive (WBHEA) between said first and second webs of material within said perimeter interior for maintaining said first and second webs of material in spaced apart relationship at said interior; and e.) wherein at least a portion of each of said first and second webs (and desirably substantially all of the interior sections of said first and second webs) has/have a substantially uniform thickness.

BRIEF DESCRIPTION OF THE DRAWINGS

FIG. 3A is a plan view of one layer of the envelope showing multiple perforations.

FIGS. 5-10 show schematically successive representations of the layers through the in-line process of FIG. 4 for forming the envelope of FIG. 1.

DETAILED DESCRIPTION OF THE INVENTION

Figure 3:
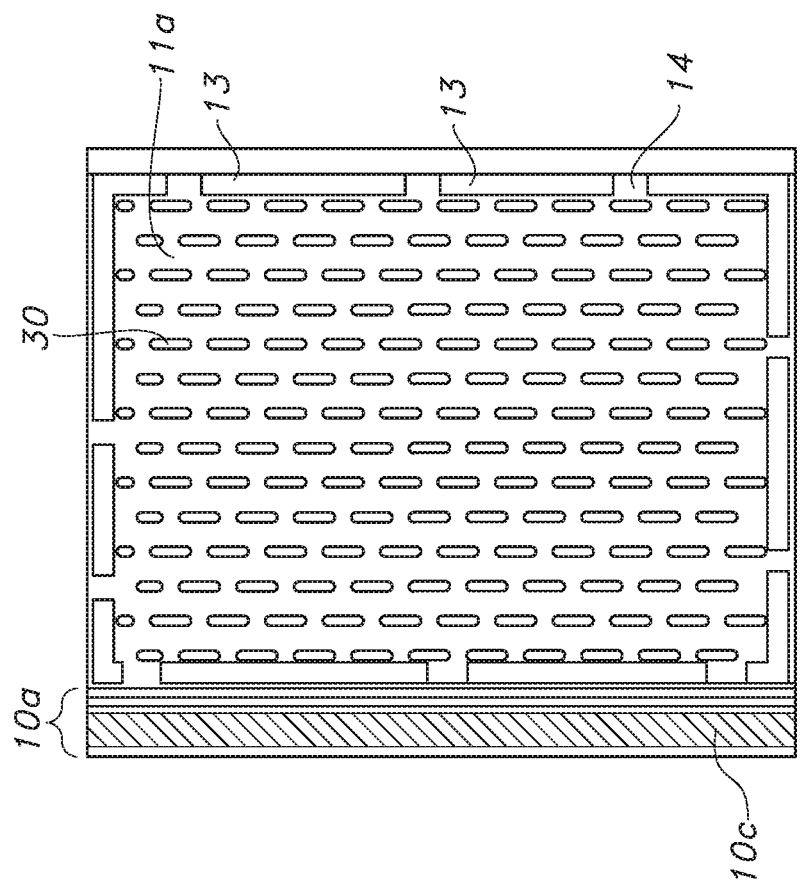
FIG. 3 is a plan view of one layer of the envelope shown in FIG. 2 including an expandable adhesive pattern.

The present invention provides an improved padded envelope and padded wrap by employing expandable adhesive between layers of the envelope. As will be described in further detail hereinbelow, an expandable adhesive is positioned between layers of a multi-layer envelope. When the expandable adhesive is subjected to heat such as may be provided by RF energy, the expandable adhesive expands to provide padding between the layers.

While an envelope is disclosed having two multi-layered webs forming a pocket for receiving a product to be protected, it may be appreciated that a padded wrap may also be formed by employing one of the multi-layered padded webs.

Water-based Adhesive Component

The water-based heat-expandable adhesives (WBHEAs) of the present invention may be selected from a variety of compositions. Useful compositions for the WBHEAs are described in U.S. Application 62/533,957, filed 18 Jul. 2017, the subject matter of which is incorporated by reference herein in its entirety. The water-based polymer used in the WBHEAs is prepared by emulsion polymerization, and may be a single grade or a mixture of synthetic emulsion polymer or polymers of a natural origin. Non-limiting examples of polymers useful for forming the WBHEAs include emulsion-based polymers selected from starch, vinyl acetate ethylene dispersion, polyvinyl acetate, polyvinyl alcohol, polyvinyl acetate/polyvinyl alcohol copolymers, dextrin stabilized polyvinyl acetate, polyvinyl acetate copolymers, vinyl acetate/ethylene copolymers, vinylacrylic, styrene acrylic, acrylic, styrene butyl rubber, polyurethane and mixtures thereof.

The water-based polymer may be present in the composition in any amount, and desirably is present in an amount of from about 60% to about 99.5 wt %, preferably from about 65% to about 95 wt %, by weight of the composition prior to setting of the composition.

The WBHEAs of the present invention desirably have a solids content of about 40% to about 70% by weight of the total adhesive composition, and more desirably about 50% to about 60% by weight of the total adhesive composition.

The WBHEAs of the present invention desirably have a viscosity which permits high speed application on a moving web substrate to allow continuous manufacturing. Thus the rheology of the adhesive must have sufficient structural body to be deposited and remain in place during processing. For example, the viscosity must be high enough not to appreciably migrate when deposited on the substrate and to remain substantially stationary through the manufacturing process, such that when expanded, a substantially uniform padded product results. Useful ranges of viscosities include 500 to about 5,000 cPs at about 25° C. to about 40° C., and desirably about 1,500 cPs to about 5,000 cPs at about 25° C. to about 40° C.

The WBHEAs of the present invention include a plurality of heat-expandable microspheres having an initial expansion temperature range of from about 35° C. to about 110° C. and a maximum expandable temperature range of about 50° C. to about 150° C. These microspheres may be made from a variety of materials, but generally have a polymeric shell and a hydrocarbon core. A blowing agent generally comprises the core and it is designed to activate upon reaching a specified temperature.

One particularly useful heat-expandable microsphere comprises a polyacrylonitrile shell and a hydrocarbon core, such as those sold under the trade names DUALITE® AND EXPANCEL®. The expandable microspheres may have any expanded size, including from about 5 microns to about 30 microns in diameter. In the presence of heat, the microspheres may increase from about 3 to about 10 times their diameter.

The expandable microspheres have a particular temperature at which they begin to expand and a second temperature at which they have reached maximum expansion. Microsphere grades are typically sold with specific expansion (Texp) temperatures and maximum expansion temperatures (Tmax). The initial expansion temperature (Texp) is the typical temperature at which the microspheres start to expand (Texp), and the maximum expansion temperature (Tmax) is the temperature at which the about 80% of the microspheres have expanded. If the microspheres are exposed to temperature far greater than Tmax, the microspheres start to explode and deflate.

Depending on the fully expanded size of the microspheres, the amount of the expandable microspheres in the composition can be adjusted. Depending upon the particular expandable microspheres used in the composition, the desired amount of the microspheres in the composition may be modified.

The microspheres further increase the structural integrity of the coalesced composition after they are expanded. While introducing voids in a matrix typically decreases mechanical integrity, the microspheres in the polymeric matrix provide stiffness when applied onto substrates. This is particularly useful for packaging fragile contents.

The microsphere may be pre-expanded. If pre-expanded microspheres are added in the composition, the pre-expanded microspheres should be chosen so the RF heating will not start to decompose the microspheres. Yet in another embodiment, the microspheres may be a mixture of pre-expanded and expandable microspheres.

The present invention provides dielectric heating, particularly RF heating, a foamable waterborne composition. RF creates an alternating electric field between a dielectric material, in this invention, polar water molecules. The expandable adhesive is conveyed between the electrodes causing the water molecules in the composition to continuously reorient to face opposite electrodes. Friction from this molecular movement causes the rapid heating. RF operates at much lower frequency than microwave heating, and is associated with lower health risks than microwaves. RF is also suitable for heating bulkier and odd-shaped containers due to its higher depth of penetration.

The RF heating concurrently drives the water away from the composition to coalesce the water-based polymer and expands the microspheres as the temperature reaches the activation state of the microspheres. Heating at RF frequencies of about 14, 27 and 41 MHz, are particularly preferred. The RF devices can be designed with operational amplifiers for optimal heating.

The composition optionally further includes any plasticizers, tackifiers, humectants, accelerators, fillers, pigments, dyes, stabilizers, rheology modifiers, polyvinyl alcohols, preservatives, e.g., antioxidant, biocide; and mixtures thereof. These components can be included in an amount of from about 0.05% to about 15% by weight of the expandable adhesive composition.

Exemplary plasticizers are dibenzoates available as BENZOFLEX®, such as diethylene glycol dibenzoate, dipropylene glycol dibenzoate, and the like.

Exemplary preservatives include 1,2-benzisothiazolin-3-one, 5-chloro-2-methyl-4-isothiazolin-3-one and 2-Methyl-4-isothiazolin-3-one. Typically, preservatives may be used in an amount of from about 0.05% to about 0.5% by weight of the WBHEA composition prior to setting of the composition.

Exemplary fillers include pearl starch, physically modified starch, and chemically modified starch.

Other materials that do not adversely affect the WBHEA composition and the protective or insulating properties of the composition may be used as desired. Other additives, such as accelerators may be included in the WBHEA composition to increase the coalescence of the composition, if desired. For example various salts may be added to increase throughput and help decrease set time of the formulation. Examples of such salts include multivalent cations from water soluble salts, such as aluminum nitrate, zirconium acetate and ammonium zirconyl carbonate (available as Bacote 20 from Zirconium Chemicals). Such accelerants may generally be added in amounts of about 0.05% to about 1.0% by weight based on the total weight of the WBHEA composition.

Although the WBHEA composition can start to coalesce at room temperature, the high moisture content and will be substantially fluid until the moisture content is about 20, 19, 18, 17, 16, 15, 14, 13, 12, 11, 10, 9, 8, 7, 6, 5, 4, 3, 2 or 1 wt %, based on the total weight. Preferably, the moisture content should be maintained at levels greater than about 20 wt % to prevent premature coalescence. Premature coalescence can lead to uneven drying, leading to uneven thickness of the dried composition on substrates.

RF heating also allows for fast throughput of making articles. The composition must be designed to accommodate this fast throughput method to maximize solid contents in the composition. It is preferable that the water molecules to be efficiently driven off without leaving unsightly wrinkles or unevenness on the substrates.

One particularly useful WBHEA composition includes:

TABLE

| Component | % Wt. of Total Composition | Range |
|---|---|---|
| Resin Emulsion* | 85.4% | 70-95% |
| Expandable Microspheres | 8.0% | 4-25% |
| Benzoflex K88, Eastman | 4.0% | 0-10% |
| Glycerin | 2.4% | 0-4% |
| Methocel, K4M, Colorcon | 0.1% | 0-1% |
| Kathon, Dow Chemical | 0.1% | 0-1% |
| NaCl | — | 0-5% |

*polyvinyl acetate aqueous emulsion, solids content 54-58%; available under Dur-O-Set C325, Celanese.

The envelope of the present invention may now be described with respect to the Figures.

Figure 1:
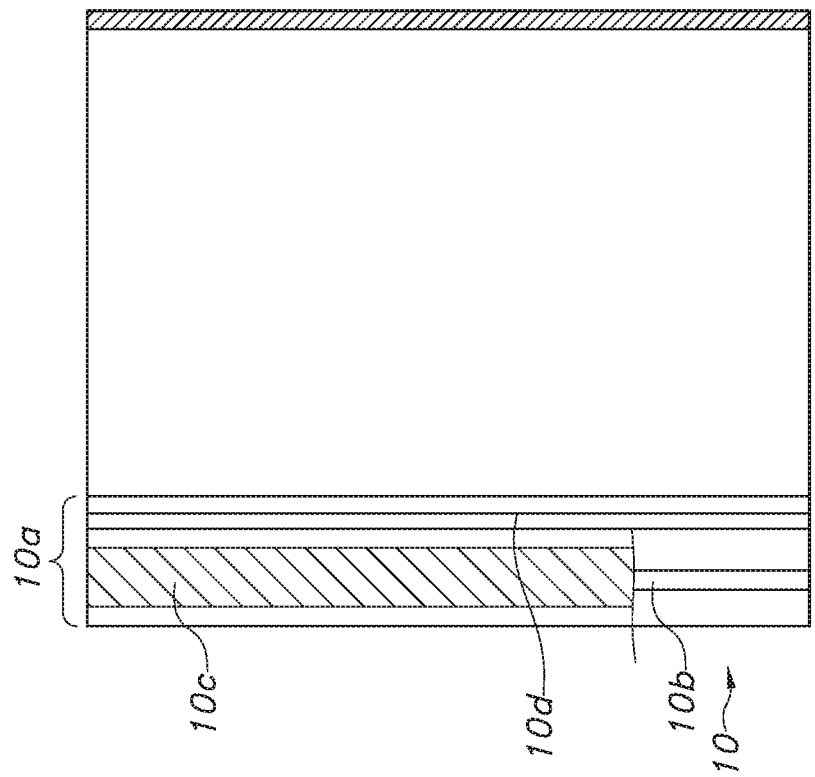
FIG. 1 is a plan view showing of a protective envelope formed in accordance with the present invention.

An envelope 10 in accordance with the present invention is shown in FIG. 1. Envelope 10 can take any conventional size (i.e., length and width) and shape and generally optionally includes an opening closable by a flap 10a (also shown in FIGS. 5-10). As will be described in further detail hereinbelow, the flap 10a includes a double-sided tape strip 10b covered by a release layer 10c. When the release liner 10c is removed and the flap 10a folded onto the envelope the double-sided tape closes the opening. Fold line 10d is shown in FIG. 1. While double-sided tape is shown in the preferred embodiment, it may be appreciated that any appropriate closure may be employed.

Figure 2:
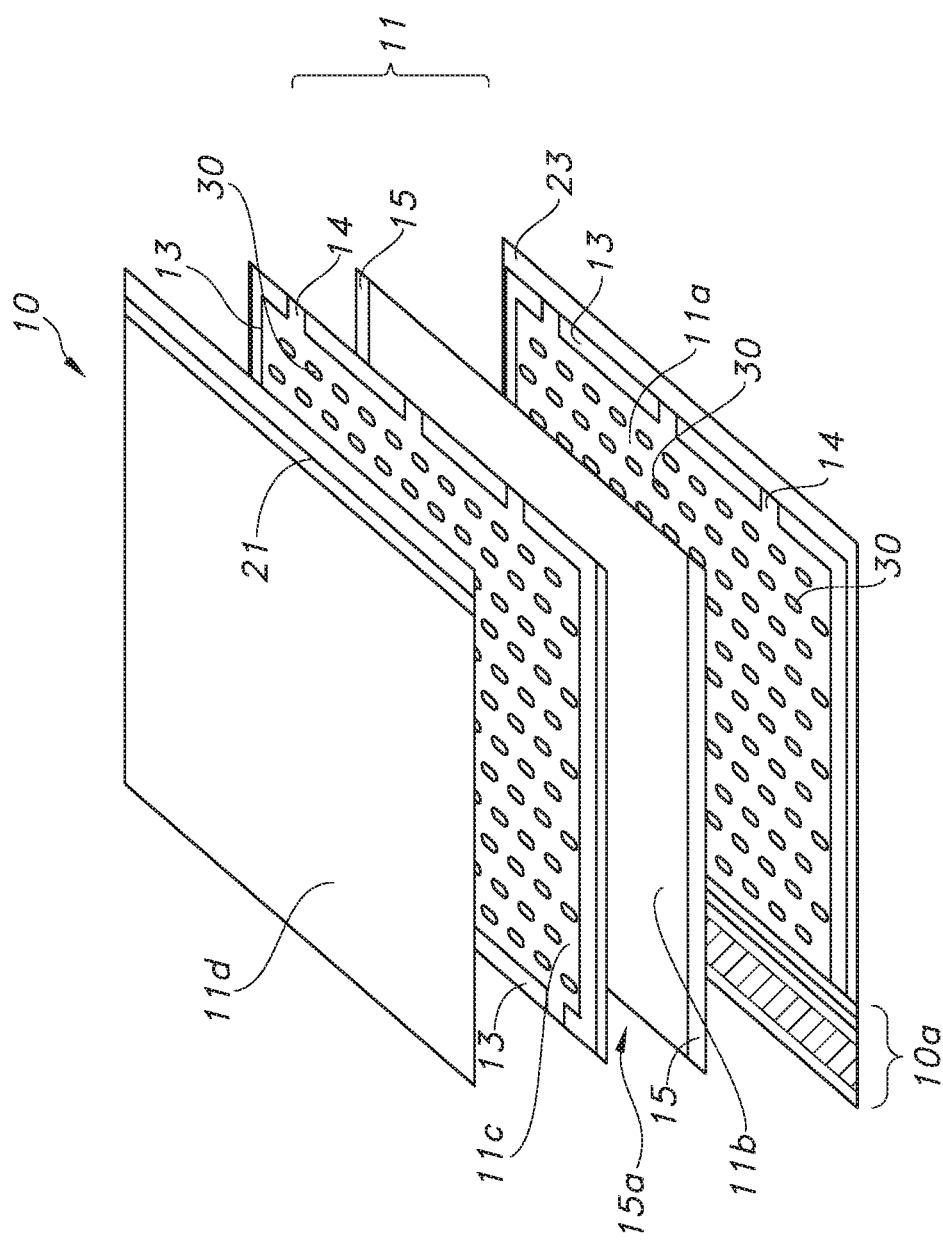
FIG. 2 is schematic representation of the layers used to form the envelope of FIG. 1.

Referring additionally to FIG. 2, the envelope 10 of the present invention includes four layers 11 denoted as layers 11a-11d as shown from top to bottom in FIG. 2. In the present illustrative embodiment, each layer, which is also referred to as a web substrate or ribbon, is typically formed of paper. While paper is shown as a preferred embodiment, it may be appreciated that other materials may be used to form the substrate of layers 11. For example, wax-coated paper, paper with plastic, or water-resistant or stain-resistant coatings are useful. Pre-printed rolls of paper or other material may also be used to provide advertising or other information on the final product.

Layer 11a which is the bottom layer, is further shown in detail in FIG. 3, and includes the extending flap 10a of FIG. 1, the double-sided tape strip 10b and release layer 10c. In all other respects, layer 11a is substantially similar to layer 11c. Layers 11b and 11d (FIG. 2) are paper substrates where, as will be described in further detail hereinbelow, layer 11b is attached to layer 11a and layer 11d is attached to layer 11c.

The substrate layers may be made from a variety of eco-friendly materials. Desirably the substrates are made from cellulosic materials such as paper. Referring now to FIGS. 2 and 3, layer 11a is provided on the upper surface with a glue line 13 perimetrically about the sheet 11a. The glue line 13, which is applied in a manner described hereinbelow, is generally contiguous about the perimeter of layer 11a but has periodic spaces 14 therebetween. Layer 11b is applied to layer 11a such that the adhesive will bind the perimeters of layer 11a to layer 11b. It is noted that the glue line 13 on the perimeter of 11a is interrupted by the periodic spaces 14 therebetween such that where when layer 11b is applied to layer 11a no sealing will take place at space 14. This provides air gaps between the layers for purposes which will be describe hereinbelow. The precise location and size of the spaces or air gaps may be varied.

Alternately or in addition, a pattern of vent perforations 40 may be placed in the envelope 10 for similar purposes, as also described and set forth hereinbelow and shown in FIG. 3A, the vent perforations 40 may also be used for venting steam.

Layer 11c (FIG. 2) includes similar glue line 13 around the perimeter of the upper surface with spaces 14 therebetween and accommodates layer 11d thereon in a similar sealed fashion.

Layer 11b includes on its upper surface a glue line 15 which extends on upper and lower sides of the upper surface layer 11b. The glue line 15 may be continuous on all three sides. The glue line 15 allows layer 11b to be sealed to layer 11c. One unglued edge 15a forms an open end which defines the opening of the pocket in the envelope when the four layers are laminated together.

Figure 3D:
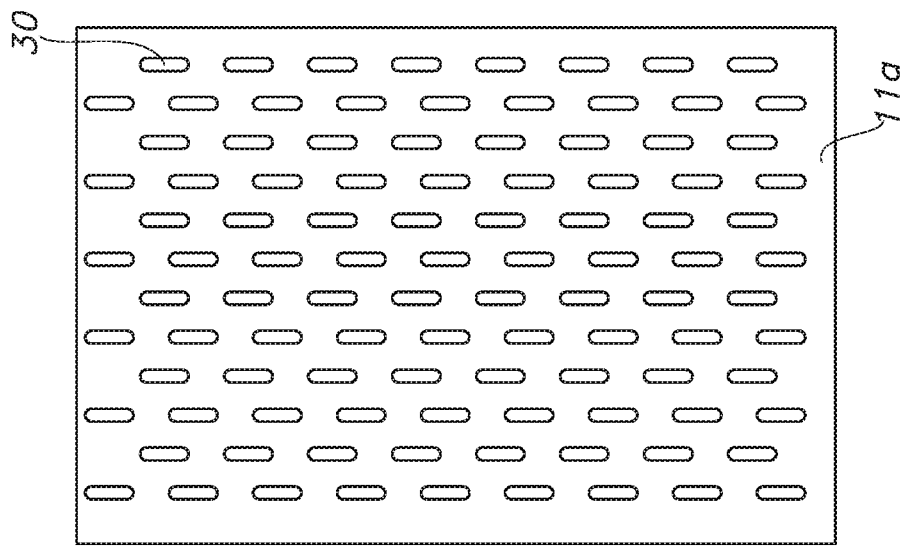
FIG. 3B-3D show alternate arrangements of the pattern of expandable adhesive.
Figure 3C:
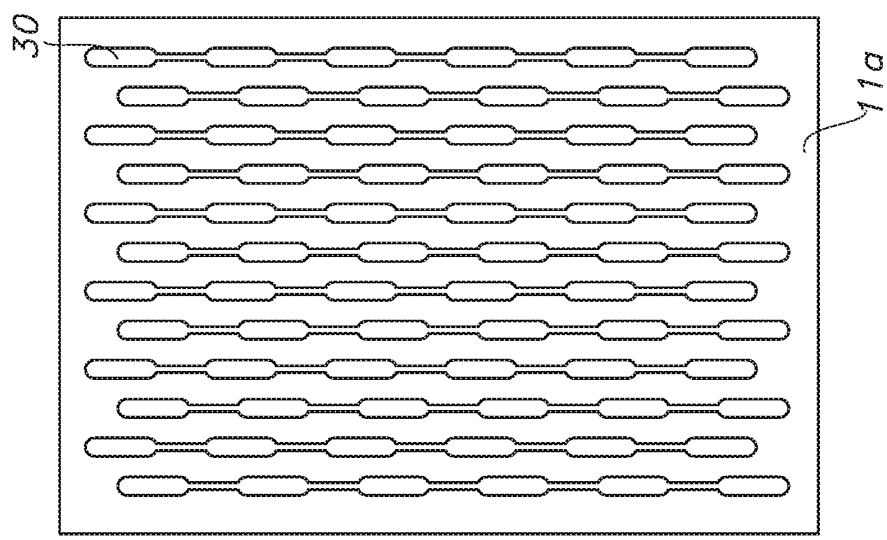
Figure 3B:
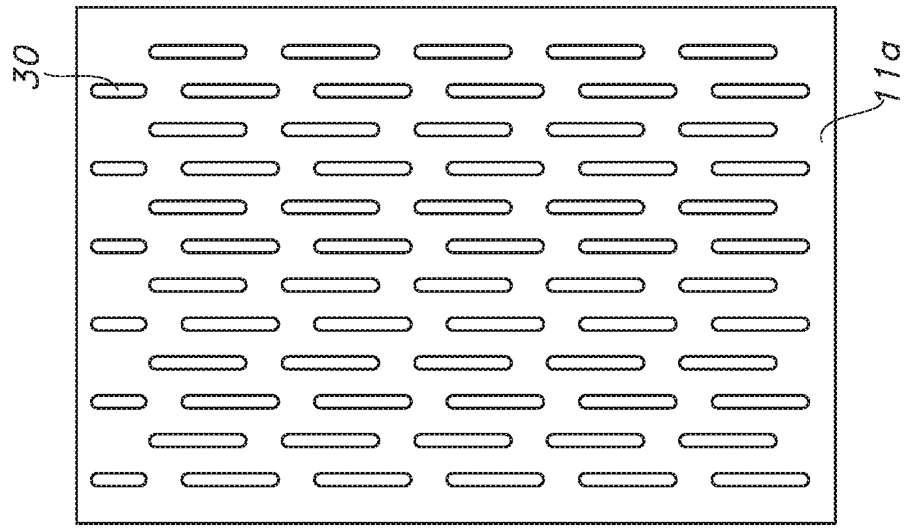

With respect to layers 11a and 11c (FIG. 2), disposed within the perimeter on the upper surface of the layers is a pattern of expandable adhesive 30. Expandable adhesive (WBHEA) 30 is applied in a pattern where spaces exist between multiple adhesive deposits. The pattern is chosen to allow for appropriate expansion of the adhesive. The absence of space to allow proper expansion is thus not desirable nor generally optimum. Any chosen pattern may include one or more variations of spacings for expansion. For example, discrete areas of adhesive may be used, which are unconnected or discontinuous to other discrete areas of adhesive; or discrete areas of adhesive may be used in combination with connecting bridges of adhesive between the discrete areas, such that they are connected but still provide expansion room. The discrete areas of adhesive may be any shape or configuration to serve the purpose of providing a protective padding upon expansion. Non-limiting examples of such additional patterns are shown in FIGS. 3B-3D. As described hereinbelow, these spaces or areas between adhesive allow for expansion of the adhesive. The WBHEA pattern may be configured in various ways to fit the final product and provide the desired padding. For example, the pattern may be a series of linear or non-linear spaced apart deposits of adhesive. These deposits may be connected at one or more places or may be positioned in a parallel or non-parallel configuration. FIG. 3 shows a linear pattern of adhesive deposits. The pattern may outline various geometric shapes such as squares, rectangles, triangles, spirals, lines or beads, circles and the like. Alternatively, the pattern may be contiguous in one direction.

Figure 4:
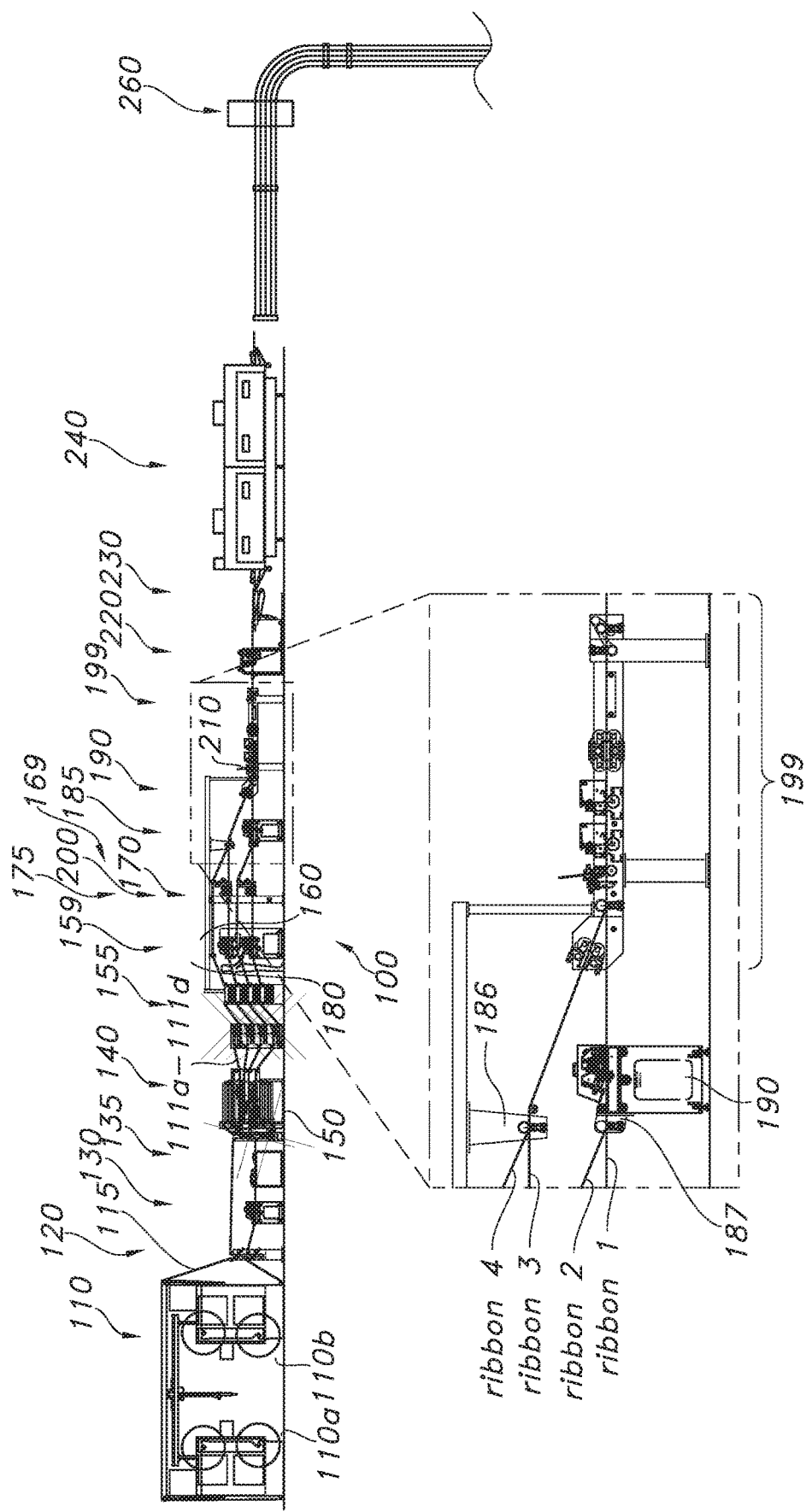
FIG. 4 is a schematic representation of a preferred in-line process used to form the envelope of FIG. 1.

A method of manufacturing the protective padded wrap and an envelope formed therefrom in accordance with the preferred method present invention may now be described with reference to FIG. 4.

A production line 100 is shown schematically. Line 100 includes several forming and processing stations which are used to form the wrap and the envelope. These stations describe and show the preferred processing steps in accordance with the present invention. However, it may be appreciated that not all the steps need be practiced to form the wrap or the envelope, and the steps which are provided need not be necessarily used in the order described hereinbelow.

Referring again to FIG. 4, station 110 depicts a substrate supply station (splicer and/or unwinding station) which is designed to supply a substrate 115 which is formed into the envelope 10. The substrate 115 may be supplied from a number of rolls 110a, 110b placed in a splicer. As is well known, when the line is running, one or more of the rolls is unwinding to supply the substrate while other of the rolls are maintained in reserve (static). The unwinding roll is held back through means of a large roller break thus creating tension on the substrate as it is fed into the production line. When a first roll runs out, the splicer will splice a second roll so that the line may be run continuously without slow down or shut down. In the present illustrative embodiment, paper is used as the substrate. However, a wide variety of materials may be used to form the web and envelope.

The substrate 115 is fed to station 120 which is an infeed station. The infeed station takes the substrate 115 from the supply station and feeds it into the production line at a controlled repeatable rate. This infeed station 120 includes several non-drive rollers and one or more drive rollers. It is contemplated that smaller envelopes may be run with one web while larger envelopes may be run with 2 or more webs. The drive roller receives rotational drive via connection to a common line shaft that runs from the infeed to a rotary cutter which will be described in detail hereinbelow. Alternately, servo motors can be directly connected to the drive rollers independently.

Next, the substrate is fed to station 130 which is an imaging station. The imaging station 130 utilizes any appropriate printing method, such as a flexographic print station, to deliver a printed image onto the substrate 115 as the substrate is moving through the imaging station. Information such as a bar code, company logo, advertisement or other information can be printed on the substrate at the imaging station. Pre-printed roll stock may also be used instead of printing in the production line.

The printed substrate is next fed into an infrared (IR) dryer station 135. This station employs an IR lamp to dry the ink.

The printed substrate is next fed to station 140 which is a combination ribbon deck and web slitting station. The station slits the substrate into smaller ribbons, which may be a variety of different widths, typically 4 individual ribbons 111a-111d. These ribbons 111a-111d make up the layers 11a-11d of envelope 10 as shown in FIGS. 1-3. Also at station 140 vent perforations if desired are placed in the surface of ribbons 2 and 3 (111b and c) These vent perforations 40 are shown in FIG. 3A.

In addition, the four ribbons (111a-111d) then engage the ribbon deck of station 140. The ribbon deck station 140 arranges the 4 ribbons in vertical sequence over one another. For present purposes, the ribbons are numbered 1-4 (111a-111d) from bottom to top as shown in FIG. 4.

Optional web guides 155 provide side-to-side alignment of the ribbons and facilitate guidance from the ribbon deck station 150 to the next station which is the first gluer station.

A gluer station 159 includes two gluers, one lower and one upper. A first lower gluer 160 which is used to apply a pattern of glue onto the ribbon number 1. Glue is placed on the top surface of ribbon number 1 from a transfer roller which takes up glue from a pan reservoir and delivers the glue to the top of ribbon 1 or via any appropriate application method in a glue line pattern which is described hereinabove as glue line 13 with respect to FIGS. 1-3. The desired glue pattern may be formed by various methods, including placing indicia on the cylinder to form the desired pattern. For example, sticky pads may be placed on the cylinder to form the desired glue pattern.

Gluer station 159 includes a second upper gluer 180 which lays down a pattern of glue on the top side of ribbon 3. Glue is placed on the top surface of ribbon number 3 from a transfer roller which takes up glue from a pan reservoir and delivers the glue to the top of ribbon 3 or via any appropriate application method in a glue line pattern which is described hereinabove as glue line 13 with respect to FIGS. 1-3. The desired glue pattern may be formed by various methods, including placing indicia on the cylinder to form the desired pattern. For example, sticky pads may be placed on the cylinder to form the desired glue pattern.

Next, the ribbons are passed to an extruder station 169. A first lower extruder 170 accommodates ribbon 1. At the extruder 170, the expandable adhesive is extruded in a designated ribbon pattern as described above and deposited on ribbon 1 inside the glue line pattern applied by glue station 160. The pattern of deposition of the expandable adhesive is described above as expandable adhesive 30 in FIGS. 2-3. The expandable adhesive may be applied by contact or non-contact extrusion valves, rotary screen printing, slot die extrusion, flexographic printing or other techniques.

Extruder station 169 also includes in stacked arrangement, a second upper extruder 200 which extrudes expandable adhesive in a designated pattern onto the upper surface of ribbon 3 within the previously glued area as described above. This is shown schematically in FIG. 7.

The glue line 13 and the pattern of expandable adhesive 30 on ribbon 1 (sheet 11a) is shown schematically in FIG. 5.

Station 169 optionally also includes a vision system 175 which provides quality control (QC) monitoring of the pattern of glue deposited on the ribbons.

A lower and upper transport station 185 helps drive the ribbons to the next station. In the lower transport station 187, ribbon 1 is married to ribbon 2. In the upper transport station 186, ribbon 3 is married to ribbon 4.

At this stage, optional rollers may be applied to provide tension to the ribbons, if necessary.

The lower two ribbons (1 & 2) are then fed to station 190 which is a third gluer station. At the third gluer station 190, glue is applied to the upper surface of ribbon 2 in a pattern described above with respect to glue line 13 as shown in FIGS. 2 and 3.

FIGS. 6 and 7 show schematically the attachment of ribbon 1 to ribbon 2 and the separate attachment of ribbon 3 to ribbon 4. This is shown for clarity. In addition, while schematically shown, the expandable adhesive 30 should be only minimally compressed, i.e., not substantially compressed between the ribbons at this stage.

The ribbons are then fed into the next station which is a finishing station 199. This station finishes the glued four ribbon web into a mailer. This process includes optionally (a) a scoring unit for ease of entry flap, (b) a transfer merge unit in which ribbons 1 and 2 are merged with ribbons 3 and 4. Continuing through the finishing station (c) application of pressure sensitive adhesive or double-sided tape, (d) application of release tape for pressure sensitive adhesive or double-sided tape, (e) seal flap scoring, (f) bottom fold score, (g) bottom folding former and gluer. As shown in FIG. 2, a thin adhesive line 21, is laid down on layer 11*d*. The side edge 23 of layer 11*a* is folded onto adhesive line 21 to close the envelope.

The ribbons then enter a rotor/cutter station 220. At the entrance to the cutter, two variable speed driven rollers gather the four married ribbons and feed these into the cutter. The speed of the rollers may be variable. The operator can create additional tension on the ribbons as they are fed through the line by adjusting the speed of the rollers. The envelopes 10 are then cut into the final length. The individual envelopes exit the rotary cutter onto a delivery table. The envelope 10 with pocket 19 is shown in FIG. 9.

A delivery conveyor 230 transfers the cut envelopes to heating/drying station 240.

At heating/drying station 240, in the preferred embodiment, RF energy is used to effect the heating and drying. As the envelopes pass through the drying station 240, the expandable adhesive between ribbons 1 and 2 and ribbons 3 and 4 expand to form the padded envelope described above. During drying, the by-product of expansion of the expandable adhesive 30 steam is released between ribbons 1 and 2 and ribbons 3 and 4 through the spaces 14 in glue line 13. Alternatively or in addition to spaces (gaps) in the glue line, vents for releasing water evaporation may be formed through punctures or perforations in the paper ribbons, i.e., web substrates. One skilled in the art can adjust the number of perforations, punctures, and/or configuration of the seam adhesive perimeter based on the porosity and thickness of the substrates.

As shown in FIG. 3A as an example, one of the layers of envelope 10 which are laminated together may include a pattern of perforations 40. This pattern of perforation serves the same purpose as the spaces 14 shown in FIG. 3. The perforations 40 may be used in addition to or in place of space 14.

Layers 11*a*-11*d* are shown both prior to RF expansion in FIG. 9 and after RF expansion in FIG. 10.

Additionally, just beyond station 240 a sizing and shaping station 260 is provided. For clarity, this is shown in top view in FIG. 4. This function, which may be achieved by pressure, provides uniform sizing and shaping for the expandable adhesive resulting in a uniform thickness of envelope 10.

While a particular sequence of joining ribbons 1-4 is shown and described herein, as a preferred embodiment, it may be appreciated that the exact path may be varied and other sequences of joining the ribbons may be employed.

A further method of manufacturing the protective padded wrap and an envelope formed therefrom in accordance with the present invention may now be described with reference to FIG. 4A.

A production line 100' is shown schematically. Line 100 includes several forming and processing stations which are used to form the wrap and the envelope. These stations describe and show processing steps in accordance with the present invention. However, it may be appreciated that not all of the steps need be practiced to form the wrap or the envelope, and the steps which are provided need not be necessarily used in the order described hereinbelow.

Referring again to FIG. 4A, station 110' depicts a substrate supply station which is designed to supply a substrate 115' which is formed into the envelope. The substrate 115' is supplied from two rolls 110*a'*, 110*b'* placed in a splicer. As is well known, when the line is running, one roll is unwinding to supply the substrate while the other roll is maintained in reserve. The unwinding roll is held back through means of a large roller break thus creating tension on the substrate as it is fed into the production line. When the first roll runs out, the splicer will splice the second roll so that the line may be run continuously without slow down or shut down. In the present illustrative embodiment, paper is used as the substrate. However, a wide variety of materials may be used to form the web and envelope.

The substrate 115' is fed to station 120' which is an infeed station. The infeed station takes the substrate 115' from the supply station and feeds it into the production line at a controlled repeatable rate. This infeed station 120' includes several non-drive rollers and one drive roller. The drive roller receives rotational drive via connection to a common line shaft that runs from the infeed to a rotary cutter which will be described in detail hereinbelow.

Next, the substrate is fed to station 130' which is an imaging station. The imaging station 130' utilizes digital print heads that will electrically deliver a printed image onto the substrate 115' as the substrate is moving through the imaging station. Information such as a bar code, company logo, advertisement or other information can be printed on the substrate at the imaging station.

The printed substrate is next fed to station 140' which is a web slitting station. The web slitting station slits the substrate which is typically 40 inches in width into smaller ribbons, typically 4 individual ribbons 115*a'*-115*d'*. These ribbons 111*a'*-111*d'* make up the layers 11*a*-11*d* of the envelope.

The four ribbons (111*a'*-111*d'*) are then transferred to station 150' which is a ribbon deck. The ribbon deck station 150', which employs a dry roller, arranges the 4 ribbons in vertical sequence over one another. For present purposes, the ribbons are numbered 1-4 (111*a*-111*d*) from bottom to top as shown in FIG. 4A. Optional web guides 155' help take the ribbons from the ribbon deck station 150' to the next station which is first gluer station 160'.

First gluer station 160' is used to apply a pattern of glue onto ribbon number 1 while allowing ribbons 2-4 to pass therethrough. Glue is placed on the top surface of ribbon number 1 from a transfer roller which takes up glue from a pan reservoir and delivers the glue to the top of ribbon 1 in a glue line pattern. Sticky back pads placed on the cylinder form the desired glue pattern.

Next, the ribbons are passed to a first extruder station 170'. Station 170' accommodates ribbon 1 while allowing ribbons 2-4 to pass therethrough. At the extruder station 170', the expandable adhesive is extruded in a designated ribbon pattern as described above and deposited on ribbon 1 inside the glue line pattern applied by glue station 160'. The pattern of deposition of the expandable adhesive may be as described above. The expandable adhesive may be applied by contact or non-contact extrusion valves, rotary screen printing, slot die extrusion, flexographic printing or other techniques.

The glue line and the pattern of expandable adhesive on ribbon 1 (sheet 11*a*) after it exits first extruder station 170' is generally as shown and described above.

The ribbons are then moved to station 180' which is a second gluer station. Second gluer station 180' lays down a pattern of glue on the top side of ribbon 2. The pattern may be U-shaped so as to allow the final product to function as a padded envelope. The U-shaped glue pattern provides an opening for the envelope. This is deposited as a glue line with an open side. At this point, ribbon 2 is also married over the top of ribbon 1 forming a lower half of the padded envelope. Ribbon 1 (sheet 11*a*) is married to ribbon 2 (sheet 11*b*). As sheet 11*b* is placed over sheet 11*a* it flattens and spreads the expandable adhesive.

At this stage, optional rollers may be applied to provide tension to the ribbons, if necessary.

The ribbons are then fed to station 190' which is a third gluer station. At the third gluer station 190', glue is applied to the upper surface of ribbon 3.

The next station 200' is a second extruder station which extrudes expandable adhesive in a designated pattern onto the upper surface of ribbon 3 within the previously glued area as described above.

Figure 4A:
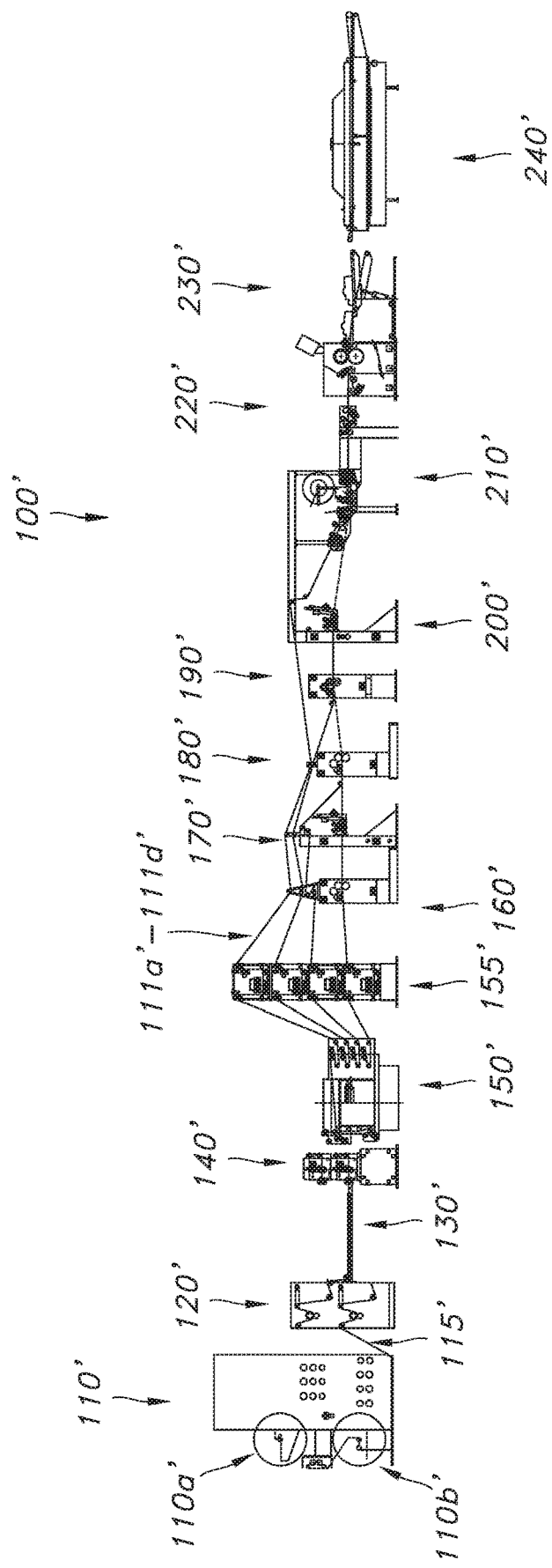
FIG. 4A is a schematic representation of an alternate in-line process used to form an envelope of the present invention.

The method described in FIG. 4A attaches ribbon 1 to ribbon 2, then attaches ribbon 3 to ribbons 1/2, and then attaches ribbon 4 to ribbons 1/2/3. The expandable adhesive should be only minimally compressed, i.e., not substantially compressed between the ribbons at this stage.

The ribbons are then fed into the next station which is a tape applicator station 210'. All fours ribbons become married as they enter station 210'. At the tape applicator station 210', a double sided tape, along with a protective release strip, is applied. The tape is applied to the portion of the ribbon which forms the envelope. The tape and the release strip will be fed onto the running envelope in a continual stream just prior to rotary cutting.

The ribbons then enter a rotary cutter station 220'.

At the entrance to the cutter station 220', two variable speed driven rollers gather the four married ribbons and feed these into the cutter. The speed of the two rollers is variable. The operator can create additional tension on the ribbons as they are fed through the line by adjusting the speed of the rollers. The envelopes are then cut into the final length. The individual envelopes exit the rotary cutter onto a delivery table.

A delivery conveyor 230' transfers the cut envelopes to heating/drying station 240'.

At heating/drying station 240', in the preferred embodiment, RF energy is used to effect the heating and drying. As the envelopes pass through the drying station 240', the expandable adhesive between ribbons 1 and 2 and ribbons 3 and 4 expand to form the padded envelope described above. During drying, the by-product of expansion of the expandable adhesive (steam) is released between ribbons 1 and 2 and ribbons 3 and 4 through the spaces (vents) 14 in the glue line.

Items:

Item 1: A method of manufacturing a protective padded wrap on a continuous manufacturing line, the method including:

a.) providing a first continuous web substrate having a top side and a bottom side, and a length and a width which defines a perimeter and an inner perimeter portion;

b.) providing a second continuous web substrate having a top side and a bottom side, and a length and width which defines a perimeter thereabout and an inner perimeter portion;

c.) forming a sealable perimeter portion by applying a layer of sealing adhesive about the perimeter of the top side of the first web to form a sealable perimeter portion, the padded wrap having vents to allow for water evaporation, wherein the vents may be formed from one or more of: gaps in the sealing adhesive; punctures in the inner perimeter portion and perforations in the inner perimeter portion;

d.) depositing a pattern of a water-based heat-expandable adhesive (WBHEA) comprising a water-based polymer and a plurality of heat-expandable microspheres on the inner portion of one or more of the first web and the second web, the WBHEA forming a protective padded area when expanded;

e.) joining the first and second webs at their respective perimeters to form a sealed structure enclosing the WBHEA without substantially compressing the WBHEA therebetween;

f.) exposing the sealed structure to RF radiation to expand and set the WBHEA to form the protective padded wrap; and g.) optionally further processing the protective padded wrap to provide a desired uniformity in thickness and/or desired shape in at least one section of the protective padded wrap.

Item 2: The method of item 1, wherein the sealing adhesive forms a discontinuous layer to form gaps for venting.

Item 3: The method of item 1, wherein the sealing adhesive is a continuous layer and the sealable perimeter portion includes perforations or punctures for venting.

Item 4: The method of item 1 further comprising:

forming a second protective padded wrap and joining it with the previously formed protective padded wrap by sealing the two protective wraps at their perimeters to form an open pouch therebetween, optionally including a closure flap.

Item 5: The method of item 1, wherein the WBHEA has a viscosity range of about 500 cps to about 5,000 cps at about 25° to about 40° C.

Item 6: The method of item 1, wherein the WBHEA pattern is formed by a continuous or discontinuous application of the WBHEA which allows sufficient space for expansion.

Item 7: The method of item 6, wherein the pattern provides discrete areas of adhesive which include one or more connections by bridges of WBHEA therebetween.

Item 8: The method of item 6, wherein the discontinuous pattern of the WBHEA comprises an array of discrete elements (beads) having a length and a width, the shortest of those dimensions being in the range of about in the range of about 0.05 inches to about 2.0 inches and longest of those dimensions being in the range of about 0.2 to about 2.5 inches.

Item 9: The method of item 1, wherein the WBHEA has a total solids content of about 40% to about 70% by weight, that is, the dry weight, including the microspheres.

Item 10: The method of item 1 wherein joining the first and second webs at their respective perimeters includes the use of pressure to facilitate formation of the sealed structure.

Item 11: The method of item 1, wherein the WBHEA comprises an emulsion-based polymer selected from the group consisting of starch, vinyl acetate ethylene dispersion, polyvinyl acetate, polyvinyl alcohol, polyvinyl acetate/polyvinyl alcohol copolymers, dextrin stabilized polyvinyl acetate, polyvinyl acetate copolymers, vinyl acetate/ethylene copolymers, vinylacrylic, styrene acrylic, acrylic, styrene butyl rubber, polyurethane and mixtures thereof.

Item 12: The method of item 1, wherein the WBHEA includes a plurality of heat-expandable microspheres having an initial expansion temperature range of from about 35° C. to about 110° C. and a maximum expandable temperature range of about 50° C. to about 150° C.

Item 13: The method of item 12, wherein the heat-expandable microspheres comprise a polyacrylonitrile shell and a hydrocarbon core.

Item 14: The method of item 1, wherein the RF is applied at frequencies which generate sufficient heat to activate the expansion of the heat-expandable microspheres and coalescence the water-based polymer.

Item 15: The method of item 14, wherein the RF is applied at frequencies of about 14 Mhz to about 41 Mhz.

Item 16: The method of item 1 wherein the substrate comprises a cellulosic material.

Item 17: The method of item 16 wherein the cellulosic material comprises a paper having a weight basis of about 10 lbs. to about 60 lbs; desirably about 20 lbs. to about 24 lbs.

Item 18: The method of item 17 wherein the cellulosic material has a thickness of about 0.002 in. to about 0.010 in, Item 19: The method of item 1 wherein the substrate is selected from the group consisting of fiberboard, corrugated board, kraft paper and coated paper.

Item 20: The method of item 1, wherein the thickness of the inner-perimeter portion of the one or more web substrates is substantially uniform prior to exposure to RF.

Item 21: The method of item 1 wherein the WBHEA includes an additive selected from the group consisting of plasticizers, accelerants, tackifiers, humectants, preservatives, antioxidants, biocides, fillers pigments, dyes, stabilizers, rheology modifiers, polyvinyl alcohol and combinations thereof.

Item 22: A method of manufacturing a protective padded wrap in a continuous manufacturing line which includes:

a.) providing a first web substrate having a top side and a bottom side, and a length and a width which define a perimeter and an inner portion within the perimeter;

b.) providing a second web substrate having a top side and a bottom side, and a length and width which define a perimeter and an inner portion within the perimeter, wherein the perimeter of the first web is in spaced-apart alignment with the perimeter of the bottom side of the second web;

c.) forming a sealable perimeter by applying a layer of sealing adhesive about the perimeter of the top side of the first web to form a sealable perimeter portion, the padded wrap having vents to allow for water evaporation, wherein the vents may be formed from one or more of: gaps in the sealing adhesive; punctures in the perimeter portion and perforations in the perimeter portion;

d.) depositing a pattern of a water-based heat-expandable adhesive (WBHEA) on the inner portion within the perimeter of the top side of the first web, the WBHEA forming a protective padded area when expanded;

e.) forming a laminated structure by mating the top side of the first web with the bottom side of the second web at their respective perimeter portions to form one or more sealed seams, the laminated structure housing the WBHEA therebetween, wherein the formation of the laminated structure is carried out without substantially compressing the WBHEA therebetween and substantially maintaining the dimensions of the pattern of WBHEA prior to its expansion;

f.) exposing the thus formed laminated structure to sufficient RF radiation to expand and set/coalesce the WBHEA to form the punctures or perforations to permit water vapor to escape; and g.) Optionally further processing the protective padded wrap to provide a desired uniformity in thickness and/or desired shape in at least one section of the protective padded wrap.

Item 23: The method of item 22, wherein the sealing adhesive forms a discontinuous layer to form gaps for venting.

Item 24: The method of item 22, wherein the sealing adhesive forms a substantially continuous sealing layer and the sealable perimeter portion includes perforations or punctures for venting.

Item 25: The method of item 22, wherein the WBHEA has a viscosity range of about 500 cps to about 5,000 cps at about 25° to about 40° C.

Item 26: The method of item 22, wherein the discontinuous pattern of the WBHEA comprises an array of discrete elements (beads) having a length and a width, the shortest of those dimensions being in the range of about in the range of about 0.05 inches to about 2.0 inches and longest of those dimensions being in the range of about 0.2 to about 2.5 inches.

Item 27: The method of item 22, wherein the WBHEA has a total solids content of about 40% to about 70% by weight.

Item 28: The method of item 22, wherein mating the top side of the first web with the bottom side of the second web at their respective perimeter portions to form one or more sealed seams includes the use of pressure to facilitate formation of the laminated structure.

Item 29: The method of item 22, wherein the WBHEA comprises an emulsion-based polymer selected from the group consisting of starch, vinyl acetate ethylene dispersion, polyvinyl acetate, polyvinyl alcohol, polyvinyl acetate/polyvinyl alcohol copolymers, dextrin stabilized polyvinyl acetate, polyvinyl acetate copolymers, vinyl acetate/ethylene copolymers, vinylacrylic, styrene acrylic, acrylic, styrene butyl rubber, polyurethane and mixtures thereof.

Item 30: The method of item 22, wherein the WBHEA includes a plurality of heat-expandable microspheres having an initial expansion temperature range of from about 80° C. to about 110° C. and a maximum expandable temperature range of about 50° C. to about 150° C.

Item 31: The method of item 28, wherein the heat-expandable microspheres comprise a polyacrylonitrile shell and a hydrocarbon core.

Item 32: The method of item 22, wherein the RF is applied at frequencies which generate sufficient heat to activate the expansion of the heat-expandable microspheres and coalescence the water-based polymer.

Item 33: The method of item 31, wherein the RF is applied at frequencies of about 14 Mhz to about 41 Mhz.

Item 34: The method of item 22 wherein the substrate comprises a cellulosic material.

Item 35: The method of item 37 wherein the cellulosic material has a thickness of about 0.002 in. to about 0.010 in, desirably 0.0035 in. to about 0.0050 in.

Item 36: The method of item 22, wherein the substrate is selected from the group consisting of fiberboard, corrugated board, kraft paper and coated paper Item 37: The method of item 22, wherein the thickness of the inner-perimeter portion of the one or more web substrates is substantially uniform prior to exposure to RF.

Item 38: The method of item 22 wherein the WBHEA includes an additive selected from the group consisting of plasticizers, accelerants, tackifiers, humectants, preservatives, antioxidants, biocides, fillers pigments, dyes, stabilizers, rheology modifiers, polyvinyl alcohol and combinations thereof.

Item 39: A method of manufacturing a protective padded pouch comprising:

a.) providing a first web having a length and width and a top side and a bottom side, which define a perimeter thereabout and an inner portion within the perimeter;

b.) providing a second web having a length and width and a top side and a bottom side which define a perimeter thereabout and an inner portion within the perimeter;

c.) forming a sealable perimeter portion by applying a layer of sealing adhesive about the perimeter of the top side of the first web to form a sealable perimeter portion, the sealable perimeter portion having vents to allow for water evaporation, wherein the vents may be formed from one or more of: gaps in the sealing adhesive; punctures in the perimeter portion and perforations in the perimeter portion;

d.) depositing a pattern of a water-based heat-expandable adhesive (WBHEA) on the inner portion within the perimeter of the top side of the first web, the WBHEA forming a protective padded area when expanded;

e.) forming a two-layer laminate structure by mating the top side of the first web with the bottom side of the second web at their respective sealable perimeter portions to form one or more sealed seams having, the two layer laminated structure sealing the WBHEA therebetween, wherein the formation of the laminated structure does not substantially compress and substantially maintains the dimensions of the pattern of WBHEA prior to its expansion;

f.) providing a third web having a top and bottom, and a length and width which define a perimeter and an inner portion within the perimeter and applying a continuous sealing adhesive about the perimeter of the top side of the third web to form a sealable perimeter portion;

g.) mating the bottom side of the third web with the top side of the two-layer laminate structure to form a pouch having an open side;

h.) forming a sealable perimeter portion by applying a layer of sealing adhesive about the perimeter of the top side of the third web to form a sealable perimeter portion, the sealable perimeter portion having vents to allow for water evaporation, wherein the vents may be formed from one or more of: gaps in the sealing adhesive; punctures in the perimeter portion and perforations in the perimeter portion;

i.) depositing a pattern of a water-based heat-expandable adhesive (WBHEA) on the inner portion within the perimeter of the top side of the third web, the WBHEA forming a protective padded area when expanded;

j.) providing a fourth web having a top side and a bottom side, and a length and a width which define a perimeter and an inner portion within the perimeter;

k.) mating the bottom side of the fourth web with the top side of the third web to form a four-layer laminate structure and enclose the WBHEA therebetween, wherein the four-layer laminated structure is formed without substantially compressing and while substantially maintaining the dimensions of the pattern of WBHEA prior to its expansion;

l.) exposing the thus formed four-layer laminate structure to sufficient RF radiation to expand and cure/coalesce the WBHEA between the first and second web and between the third and fourth web to form the protective padded pouch; and m.) Optionally further processing the protective padded wrap to provide a desired uniformity in thickness and/or desired shape in at least one section of the protective padded pouch.

Item 40: The method of item 39, wherein the WBHEA has a viscosity range of about 500 cps to about 5,000 cps at about 25° to about 40° C.

Item 41: The method of item 39, wherein the WBHEA pattern is formed by a continuous or discontinuous application of the WBHEA which allows sufficient space for expansion.

Item 42: The method of item 39, wherein the pattern provides discrete areas of WBHEA which include one or more connections by bridges of WBHEA therebetween.

Item 43: The method of item 39, wherein the pattern of the WBHEA comprises an array of discrete elements (beads) having a length and a width, the shortest of those dimensions being in the range of about in the range of about 0.05 inches to about 2.0 inches and longest of those dimensions being in the range of about 0.2 to about 2.5 inches.

Item 44: The method of item 39, wherein the WBHEA has a total solids content of about 40% to about 70% by weight.

Item 45: The method of item 39, wherein the mating steps in one or more of steps e), k) and j) includes the use of pressure.

Item 46: The method of item 39, wherein the WBHEA comprises an emulsion-based polymer selected from the group consisting of starch, vinyl acetate ethylene dispersion, polyvinyl acetate, polyvinyl alcohol, polyvinyl acetate/polyvinyl alcohol copolymers, dextrin stabilized polyvinyl acetate, polyvinyl acetate copolymers, vinyl acetate/ethylene copolymers, vinylacrylic, styrene acrylic, acrylic, styrene butyl rubber, polyurethane and mixtures thereof.

Item 47: The method of item 39, wherein the WBHEA includes a plurality of heat-expandable microspheres having an initial expansion temperature range of from about 80° C. to about 110° C. and a maximum expandable temperature range of about 50° C. to about 150° C.

Item 48: The method of item 39, wherein the heat-expandable microspheres comprise a polyacrylonitrile shell and a hydrocarbon core.

Item 49: The method of item 39, wherein the RF is applied at frequencies which generate sufficient heat to activate the expansion of the heat-expandable microspheres and coalescence the water-based polymer.

Item 50: The method of item 39, wherein the RF is applied at frequencies of about 14 Mhz to about 41 Mhz.

Item 51: The method of item 39, wherein the substrate comprises a cellulosic material.

Item 52: The method of item 39, wherein the cellulosic material comprises a paper having a weight of about 10 lbs. to about 60 lbs.; desirably about 20 lbs. to about 24 lbs.

Item 53: The method of item 39, wherein the cellulosic material has a thickness of about 0.002 in. to about 0.010 in, desirably 0.0035 in. to about 0.0050 in.

Item 54: The method of item 39, wherein the substrate is selected from the group consisting of fiberboard, corrugated board, kraft paper and coated paper Item 55: The method of item 39, wherein the thickness of the inner-perimeter portion of the one or more web substrates is substantially uniform prior to exposure to RF.

Item 56: The method of item 39, wherein the WBHEA includes an additive selected from the group consisting of plasticizers, accelerants, tackifiers, humectants, preservatives, antioxidants, biocides, fillers pigments, dyes, stabilizers, rheology modifiers, polyvinyl alcohol and combinations thereof.

Item 57: The method of item 39, further including a creating a closable flap for closing the open side of the pouch.

Item 58: The method of item 39, further including cutting the four-layer laminate structure into predetermined sizes.

Item 59: A system for forming padded wraps from a first and second web of material supplied from a continuous source, each web having a perimeter and a perimeter interior, said system comprising:

a.) a first adhesive station for applying a sealing adhesive to said perimeter of one surface of at least one of said webs;

b.) a second adhesive station for applying a pattern of a water-based heat-expandable adhesive (WBHEA) to said perimeter interior of one surface of at least one of said webs to form a sealable perimeter portion having vents to allow for water evaporation, c.) a joining station for joining said first and second webs by sealing said webs together at their respective perimeters with said WBHEA being maintained substantially uncompressed therebetween;

d.) a heat activation station for activating said heat-expandable adhesive to expand and cure said WBHEA;

e.) an optional sizing and/or shaping station to provide a desired uniformity in thickness and/or desired shape in at least one section of the protective padded wrap; and f.) a cutting station for cutting said webs into discrete lengths to form said padded wraps.

Item 60: The system of item 59, wherein a sizing and shaping station is included in the heat activation station.

Item 61: The system of item 59, wherein the WBHEA is waterbased and comprises water, a polymer and a plurality of heat-expandable microspheres.

Item 62: The system of item 59, wherein a padded open pouch is formed from two of said padded wraps, the system further comprising:

a pouch adhesive station for applying a continuous pouch perimeter adhesive to a perimeter of one surface of at least one of said wraps; and a pouch joining station for joining said padded wraps together at said perimeter to form said open ended pouch.

Item 63: A padded wrap comprising:

a.) first and second webs substrates of material each having a perimeter and an interior within said perimeter;

b.) a perimeter adhesive joining said first and second web substrates at their respective perimeters; and c.) a pattern of a water-based heatexpanded adhesive (WBHEA) between said first and second webs of material within their respective perimeter interiors for maintaining said first and second webs of material in spaced apart relationship at said respective interiors.

Item 64: The padded wrap of item 63, wherein the WBHEA comprises a water-based polymer and a plurality of heat-expandable microspheres.

Item 65: A padded open-ended pouch comprising:

a.) a pair of padded wraps joined substantially about their perimeter by a continuous perimeter adhesive to form an open-ended pouch, each of said padded wraps including:

b.) first and second webs of material each having a perimeter and an interior within said perimeter;

c.) a perimeter adhesive joining said first and second webs of material at said perimeter; and d.) a pattern of a water-based heat-expanded adhesive (WBHEA) between said first and second webs of material within said perimeter interior for maintaining said first and second webs of material in spaced apart relationship at said interior.

Item 66: The padded open-ended pouch of item 65, wherein the WBHEA pattern is formed by a continuous or discontinuous application the WBHEA which allows sufficient space for expansion.

Item 67: The padded pouch of item 65, wherein the pattern provides discrete areas of adhesive which include one or more connections by bridges of adhesive therebetween.

Item 68: The padded pouch of item 65, wherein the WBHEA comprises an array of discrete elements (beads) having a length and a width, the shortest of those dimensions being in the range of about in the range of about 0.05 inches to about 2.0 inches and longest of those dimensions being in the range of about 0.2 to about 2.5 inches.

Item 69: The padded open-ended pouch of item 65, wherein the WBHEA has a total solids content of about 40% to about 70% by weight.

Item 70: The padded open-ended pouch of item 65, wherein the WBHEA includes a plurality of heat-expandable microspheres having an initial expansion temperature range of from about 80° C. to about 110° C. and a maximum expandable temperature range of about 50° C. to about 150° C.

Item 71: The padded open-ended pouch of item 70, wherein the heat-expandable microspheres comprise a polyacrylonitrile shell and a hydrocarbon core.

Item 72: A method including any combination of items 1-21.

Item 73: A method including any combination of items 27-37.

Item 74: A method including any combination of items 38-57.

Item 75: A system including any combination of items 58-61.

Item 76: A padded pouch any combination of items 64-69.

Item 77: A system for forming a padded open pouch comprising:

a supply station for supplying a first, second, third and fourth webs of material a first and second gluer stations for applying a pattern of sealing adhesive onto the perimeter of said first web, and for applying a pattern of sealing adhesive onto the perimeter of said third web;

an extruder station for depositing water-based heat-expandable adhesive (WBHEA) pattern onto said first web and said third web a transport station for adhesively joining the first web to the second web and for adhesively joining said third web to said forth web;

a third gluer station for applying a pattern of adhesive onto the perimeter of the second web, a finishing station for forming the web into said open end pouch; and a heating/drying station for exposing the WBHEA pattern to RF radiation to expand and set the WBHEA.

Item 78: A system of item 77 further including a sizing and shaping station for uniformly sizing and shaping said expanded WBHEA.

Item 79: A system of item 77 further including ribbon deck station for slitting the webs into desired widths.

Item 80: A system of item 77 wherein said ribbon deck station places vent perforations in the second and third ribbons.

Item 81: A system including any combination of items 1-77.

Various changes to the foregoing described and shown structures would now be evident to those skilled in the art. Accordingly, the particularly disclosed scope of the invention is set forth in the following claims.

What is claimed is:

1. A method of manufacturing a protective padded pouch including:
providing first, second, third and fourth continuous web substrates, each having a top and bottom side and a length and a width defining a perimeter thereabout;
forming a sealable adhesive perimeter by applying a layer of sealing adhesive about the perimeter of top side of the first and third web substrates;
depositing a predetermined pattern of a water-based heat expandable adhesive (WBHEA) comprising a water-based polymer and a plurality of heat-expandable microspheres, on the inner portion of the top side of the first and third web substrates, the WBHEA forming a protective padded area when expanded, wherein the predetermined pattern includes an array of discrete elements formed on the first and third web substrates and spaces between respective discrete elements;
joining the first and second web substrates and the third and fourth web substrates about the respective perimeters to form a sealed structure enclosing the WBHEA therebetween without substantially compressing the WBHEA;
sealingly mating the top side of second web substrate to the bottom side of the third web substrate at least along a portion of the perimeter to form an open ended pouch;
with the second and third web substrate sealingly mated, exposing the WBHEA between the first and second web substrates and third and fourth web substrates to sufficient RF radiation to expand and cure/coalesce the WBHEA; and
evaporatively venting water vapor produced as a by-product of expansion of the WBHEA from between the first and second web substrates and the third and fourth web substrates during manufacturing by forming vents interior to the respective sealed perimeters.

2. A method of manufacturing a padded pouch of claim 1 wherein said joining step further includes:
joining the first and second web substrates to form a first two-layer sealed structure and joining the third and fourth web substrates to form a second two-layer sealed structure; and
wherein the said sealingly mating step includes mating said first two-layer structure with the second two-layer structure to form said open ended pouch.

3. A method of manufacturing a padded pouch of claim 1, wherein said joining and mating steps further include:
joining the first and second web substrates and then sealingly mating the second web substrate to the third web substrate and then joining said fourth web substrate to said third web substrate.

4. A method of claim 1, further comprising providing vents through the protective padded pouch, wherein the water vapor is evaporatively vented through the vents.

5. A method of claim 4, wherein providing the vents includes providing one or more of punctures or perforations in at least one of the first, second, third, and fourth web substrates, wherein the water vapor is vented through the one or more punctures or perforations.

6. A method of claim 5, wherein the one or more punctures or perforations are in one of the first or second web substrates and through one of the third or fourth web substrates.

7. A method of claim 5, wherein the one or more punctures or perforations are through each of the first, second, third, and fourth web substrates.

8. A method of claim 4, wherein the adhesive perimeter is formed, leaving gaps therein for the providing of the vents.

9. The method of claim 1, wherein:
the first and second web substrates are sealed together at a first perimeter seal to define a first inner region within the first perimeter seal between the first and second web substrates, and
the third and fourth web substrates are sealed together at a second perimeter seal to define a second inner region within the second perimeter seal between the third and fourth web substrates.

10. The method of claim 9, wherein the vents include an opening through the web substrates to the inner regions.

11. The method of claim 10, wherein the opening includes a vent opening through at least one of the first and second web substrates, and through at least one of the third and fourth web substrates.

12. The method of claim 1, wherein the RF radiation is applied at a frequency of between about 15-40 MHz.

13. The method of claim 1, wherein the pouch with the expanded WBHEA is to be flexible and flat.

14. The method of claim 1, wherein the first, second, third, and fourth continuous web substrates are formed from a cellulosic material.

15. The method of claim 1, wherein the discrete areas of the WBHEA are arranged in a plurality of lines and wherein the plurality of lines are parallel to each other.

16. The method of claim 1, wherein the discrete elements of the WBHEA are unconnected to other discrete areas of the WBHEA.

17. The method of claim 1, wherein at least one of the predetermined patterns further comprises connecting bridges of adhesive between selected ones of the discrete elements of the WBHEA.

18. A method of manufacturing a protective padded pouch, comprising:
providing first, second, third, and fourth continuous web substrates;
depositing predetermined pattern of a water-based heat expandable adhesive (WBHEA) between the first and second web substrates and between the third and fourth web substrates, wherein the WBHEA includes a water-based polymer and a plurality of heat-expandable microspheres, wherein the WBHEA is deposited in an amount sufficient to form a protective padded area when expanded, and wherein the predetermined pattern includes an array of discrete elements formed on at least one of the first and second web substrates and at least one of the third and fourth substrates and spaces between respective discrete elements;
sealing together the first and second web substrates along a first perimeter seal to form a first inner region within the first perimeter seal between the first and second web substrates, some of the WBHEA being disposed in the first inner region;
sealing together the third and fourth web substrates along a second perimeter seal to form a second inner region within the second perimeter seal between the third and fourth web substrates, some of the WBHEA being disposed in the second inner region;
connecting the second web substrate to the third web substrate along a third perimeter seal with the inner regions overlayed on each other;
heating the WBHEA within the inner regions overlayed on each other sufficiently to cause the WBHEA to expand to form the protective padded area; and evaporatively venting water vapor produced as a byproduct of expansion of the WBHEA.

19. The method of claim 18, wherein:
a pocket of the pouch, to receive a product, is defined within the third perimeter seal between the second and third web substrates, and the pouch includes an opening between the second and third web substrates configured to enable access to the pocket.

20. The method of claim 19, wherein the second web substrate is adhesively sealed to the third web substrate along the third perimeter seal.

21. The method of claim 18, wherein the heating includes exposing the WBHEA to RF radiation.

22. The method of claim 21, wherein the RF radiation is applied at a frequency of between about 15-40 MHz.

23. The method of claim 18, further comprising providing a vent communicating the inner regions to an exterior of the web substrates.

24. The method of claim 23, wherein the vent includes an opening through the web substrates to the inner regions.

25. The method of claim 24, wherein the opening includes a vent opening through at least one of the first and second web substrates, and through at least one of the third and fourth web substrates.

26. The method of claim 24, wherein the opening includes a vent opening through each of the first, second, third, and fourth web substrates.

27. The method of claim 23, wherein at least one of the first and second perimeter seals has one or more gaps providing the vent.

28. The method of claim 18, wherein, with the inner regions overlayed on each other and the WBHEA expanded, the first, second, third, and fourth web substrates are to be flexible and flat.

29. The method of claim 18, wherein the heating of the WBHEA includes heating the WBHEA within the inner regions of the first and second web substrate connected to the third and fourth web substrates along the third perimeter seal.

30. The method of claim 18, wherein the first, second, third, and fourth continuous web substrates are formed from a cellulosic material.

31. The method of claim 18, wherein the discrete elements of the WBHEA are arranged in a plurality of lines and wherein the plurality of lines are parallel to each other.

32. The method of claim 18, wherein the discrete elements of the WBHEA are unconnected to other discrete areas of the WBHEA.

33. The method of claim 18, wherein at least one of the predetermined patterns further comprises connecting bridges of adhesive between selected ones of the discrete elements of the WBHEA.

\* \* \* \* \*